United States Patent
Hirasawa

(10) Patent No.: US 11,099,472 B2
(45) Date of Patent: Aug. 24, 2021

(54) IMAGE DISPLAY APPARATUS AND LIGHT SOURCE DEVICE

(71) Applicant: SONY CORPORATION, Tokyo (JP)

(72) Inventor: Takeaki Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/605,959

(22) PCT Filed: Mar. 20, 2018

(86) PCT No.: PCT/JP2018/010962
§ 371 (c)(1),
(2) Date: Oct. 17, 2019

(87) PCT Pub. No.: WO2018/198596
PCT Pub. Date: Nov. 1, 2018

(65) Prior Publication Data
US 2020/0124956 A1    Apr. 23, 2020

(30) Foreign Application Priority Data

Apr. 27, 2017   (JP) .............................. JP2017-088120

(51) Int. Cl.
*G03B 21/20*     (2006.01)
*H04N 9/31*      (2006.01)
*G03B 21/14*     (2006.01)

(52) U.S. Cl.
CPC ....... *G03B 21/2066* (2013.01); *G03B 21/142* (2013.01); *G03B 21/2033* (2013.01); *H04N 9/3161* (2013.01); *H04N 9/3164* (2013.01)

(58) Field of Classification Search
None
See application file for complete search history.

(56) References Cited

U.S. PATENT DOCUMENTS

2008/0316565 A1    12/2008  Huang
2012/0008098 A1*   1/2012   Akiyama .............. F21S 41/153
                                                           353/30

(Continued)

FOREIGN PATENT DOCUMENTS

CN    103376634 A    10/2013
CN    105892207 A    8/2016

(Continued)

OTHER PUBLICATIONS

International Search Report dated Jun. 19, 2018 in PCT/JP2018/010962 filed Mar. 20, 2018.

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

An image display apparatus according to an embodiment of the present technology includes a light source section (610, 650), an optical element (620), and a holding section. The light source section (610, 650) emits light. The optical element (620) includes a light reflection part (626, 656) and a light transmission part (627, 657) provided at a position different from a position of the light reflection part (626, 656). The holding section movably or rotatably holds the optical element (620) and is capable of switching, for example, between a first state in which the light reflection part (626, 656) is arranged on a light path of the emitted light of the light source section (610) and a second state in which the light transmission part (627, 657) is arranged on the light path of the emitted light of the light source section (610).

18 Claims, 14 Drawing Sheets

(56) References Cited

U.S. PATENT DOCUMENTS

| | | | |
|---|---|---|---|
| 2013/0278902 A1* | 10/2013 | Chen | G03B 21/2066 353/31 |
| 2015/0316840 A1 | 11/2015 | Maeda et al. | |
| 2016/0223890 A1* | 8/2016 | Okuda | G02B 27/149 |
| 2016/0377969 A1* | 12/2016 | Nishimori | H04N 9/3158 362/259 |
| 2017/0353628 A1 | 12/2017 | Kishigami et al. | |

FOREIGN PATENT DOCUMENTS

| | | |
|---|---|---|
| JP | 2010-97003 A | 4/2010 |
| JP | 2011-43634 A | 3/2011 |
| JP | 2014-85623 A | 5/2014 |
| JP | 2014-142588 A | 8/2014 |
| JP | 2014-197068 A | 10/2014 |
| JP | 2016-145966 A | 8/2016 |
| WO | WO 2015/141044 A1 | 9/2015 |
| WO | WO 2016/117362 A1 | 7/2016 |

* cited by examiner

A

B

C

D

IMAGE DISPLAY APPARATUS AND LIGHT SOURCE DEVICE

TECHNICAL FIELD

The present technology relates to an image display apparatus such as a projector and a light source device applicable to the image display apparatus.

BACKGROUND ART

Conventionally, image display apparatuses such as projectors have been widely used. For example, an image is displayed in such a manner that light from a light source is modulated by a light modulation element such as a liquid crystal element and the modulated light is projected onto a screen or the like. As the light source, a mercury lamp, a xenon lamp, a LED (Light Emitting Diode), a LD (Laser Diode), or the like is used. Among the light sources, a solid light source such as the LED and the LD does not require the conventional replacement of a lamp owing to its long service life and is advantageous in that it is lit immediately after a power supply is turned on.

Patent Literature 1 describes a light source device using a plurality of laser light sources and an image display apparatus using the light source device. In the light source device described in Patent Literature 1, a light source section, a condensing optical system, a phosphor wheel, and an emission lens are arranged in a housing. Blue laser light emitted from the light source section is condensed onto a phosphor provided in the phosphor wheel by the condensing optical system. The phosphor is excited to convert a part of the blue laser light into yellow fluorescence and causes another part of the blue laser light to pass therethrough. Thus, white light obtained by synthesizing the blue laser light and the yellow light together is emitted via the emission lens (paragraphs [0035] to [0039] or the like of Patent Literature 1).

Patent Literature 2 describes a projection display apparatus using two lamp units. In the projection display apparatus, first and second lamp units are arranged so that their emission directions are substantially orthogonal to each other, and a synthesis mirror is arranged at a position at which respective emitted light beams are orthogonal to each other. The synthesis mirror has a reflection part and a transmission part, and first and second peak light emitted from the first lamp passes through the transmission part. Third and fourth peak light emitted from the second lamp is reflected by the reflection part to be synthesized with the first and second peak light. Thus, high-contrast image display is made possible (paragraph [0032] to [0048], FIG. 4, or the like of Patent Literature 2).

CITATION LIST

Patent Literature

Patent Literature 1: Japanese Patent Application Laid-open No. 2014-085623
Patent Literature 2: Japanese Patent Application Laid-open No. 2011-043634

DISCLOSURE OF INVENTION

Technical Problem

In the above projector or the like, a detection sensor is required to move on a light path or a light path is required to be changed to make light incident on the detection sensor in order to detect the state of the light emitted from a light source. Therefore, large space for moving an optical component or the like constituting the detection sensor or the light path is required, which causes the upsize of the apparatus.

In view of the above circumstances, it is an object of the present technology to provide an image display apparatus capable of easily changing the light path of light emitted from a light source without upsizing the apparatus, and a light source device.

Solution to Problem

In order to achieve the above object, an image display apparatus according to an embodiment of the present technology includes a light source section, an optical element, and a holding section.

The light source section emits light.

The optical element includes a light reflection part and a light transmission part provided at a position different from a position of the light reflection part.

The holding section movably or rotatably holds the optical element and is capable of switching between a first state in which the light reflection part is arranged on a light path of the emitted light and a second state in which the light transmission part is arranged on the light path of the emitted light.

In the image display apparatus, the optical element including the light reflection part and the light transmission part is used. Further, the first state in which the light reflection part is arranged on the light path and the second state in which the light transmission part is arranged on the light path are switched to each other by the holding section. Thus, it is possible to easily change the light path of the emitted light. Further, it is possible to reduce a movement amount of the optical element and substantially reduce the upsize of the apparatus.

The holding section may cause the optical element to move in parallel in a prescribed direction.

Thus, it becomes possible to easily switch between the first state and the second state. Further, it is possible to simplify the configurations of the holding section and substantially reduce the upsize of the apparatus.

The light reflection part has a light reflection surface. In this case, the light transmission part may have a light transmission surface adjacent to at least a part of the light reflection surface.

Thus, it becomes possible to substantially reduce a movement amount of the optical element to switch between the first state and the second state.

The light source section may have a plurality of light sources. In this case, the light reflection surface may have a plurality of light reflection regions provided corresponding to the plurality of light sources. Further, the light transmission surface may have a plurality of light transmission regions provided corresponding to the plurality of light sources, each of the plurality of light transmission regions being adjacent to at least one of the plurality of light reflection regions.

By the use of the plurality of light sources, the high brightness of the image display apparatus is realized. In this case as well, it is possible to reduce a movement amount of the optical element and substantially reduce the upsize of the apparatus.

The image display apparatus may further include an image generation unit that generates an image on the basis of first emitted light representing the emitted light reflected by the light reflection part and second emitted light representing the emitted light that passes through the light transmission part.

It is possible to generate a high-accuracy image on the basis of light traveling along one light path.

The image display apparatus may further include a sensor section that detects a state of emitted light not used for image generation by the image generation unit among the first emitted light and the second emitted light.

Thus, it becomes possible to easily detect the state of the emitted light without upsizing the apparatus.

The image display apparatus may further include a notification unit that notifies state information regarding a state of the light source section on the basis of a detection result by the sensor section.

Thus, it becomes possible to provide useful information regarding the maintenance, the use method, or the like of the image display apparatus.

The image display apparatus may further include another image generation unit that generates an image on the basis of emitted light not used for image generation by the image generation unit among the first emitted light and the second emitted light.

Thus, it becomes possible to generate a plurality of images.

The image display apparatus may further include another light source section that emits another light. In this case, the optical element has the light transmission part arranged on a light path of the other emitted light in the first state, and has the light reflection part arranged on the light path of the other emitted light in the second state.

Thus, it is possible to easily change the light paths of the emitted light and the other emitted light and realize the high brightness of the image display apparatus.

The light source section may emit the emitted light along a first direction. In this case, the other light source section emits the other emitted light along a second direction. Further, the optical element may reflect the emitted light in the second direction by the light reflection part in the first state and reflect the other emitted light in the first direction by the light reflection part in the second state.

Thus, it becomes possible to collectively emit the emitted light and the other emitted light in each of the first and second states, and high brightness is realized.

The first direction and the second direction may be substantially orthogonal to each other.

Thus, it becomes possible to easily switch the emission directions of the emitted light and the other emitted light in directions different from each other by approximately 90°.

The holding section may cause the optical element to move so that a part of the light reflection part and a part of the light transmission part are arranged on the light path of the emitted light.

Thus, it becomes possible to divide the emitted light and emit the divided light in different directions.

The holding section may control a ratio of a size of the part of the light reflection part arranged on the light path of the emitted light to a size of the part of the light transmission part arranged on the light path of the emitted light.

Thus, it becomes possible to control a light amount of each of the divided light.

The optical element may have an incident surface on which the emitted light is incident. In this case, the holding section may cause the optical element to rotate with a rotational axis substantially perpendicular to the incident surface being used as a reference.

Thus, it is possible to easily switch between the first state and the second state. Further, it is possible to simplify the configurations of the holding section and substantially reduce the upsize of the apparatus.

The holding section may cause the optical element to rotate at a prescribed frequency.

Thus, it becomes possible to switch between the first state and the second state at a certain frequency. As a result, it becomes possible to obtain two emitted light having a certain frequency.

The holding section may cause the optical element to rotate with the rotational axis passing through a center of the incident surface being used as a reference. In this case, the optical element may have a plurality of first light reflection regions formed along a rotational direction at a position of a first distance from the center of the incident surface and a plurality of second light reflection regions formed along the rotational direction at a position of a second distance from the center of the incident surface, the second distance being different from the first distance. Further, the number of the first light reflection regions and the number of the second light reflection regions may be different from each other.

Thus, it becomes possible to easily make the frequency of the light reflected by the plurality of first light reflection regions and the frequency of the light reflected by the plurality of second light reflection regions different from each other.

The optical element may be made of a light reflection member. In this case, the light transmission part may be constituted of a light transmission hole formed on the light transmission member.

Thus, it is possible to more easily constitute the optical element.

The optical element may be made of a light transmission member. In this case, the light reflection part may be constituted of a part to which light reflection coating is applied.

Thus, it is possible to more easily constitute the optical element.

A light source device according to an embodiment of the present technology includes the light source section, the optical element, and the holding section.

Advantageous Effects of Invention

According to the present technology, it becomes possible to easily change the light path of light emitted from a light source without upsizing an apparatus as described above. Note that the effects described here are not limitative and any effect described in the present disclosure may be produced.

MODE(S) FOR CARRYING OUT THE INVENTION

Hereinafter, embodiments according to the present technology will be described with reference to the drawings.

First Embodiment

[Image Display Apparatus]

Figure 1:
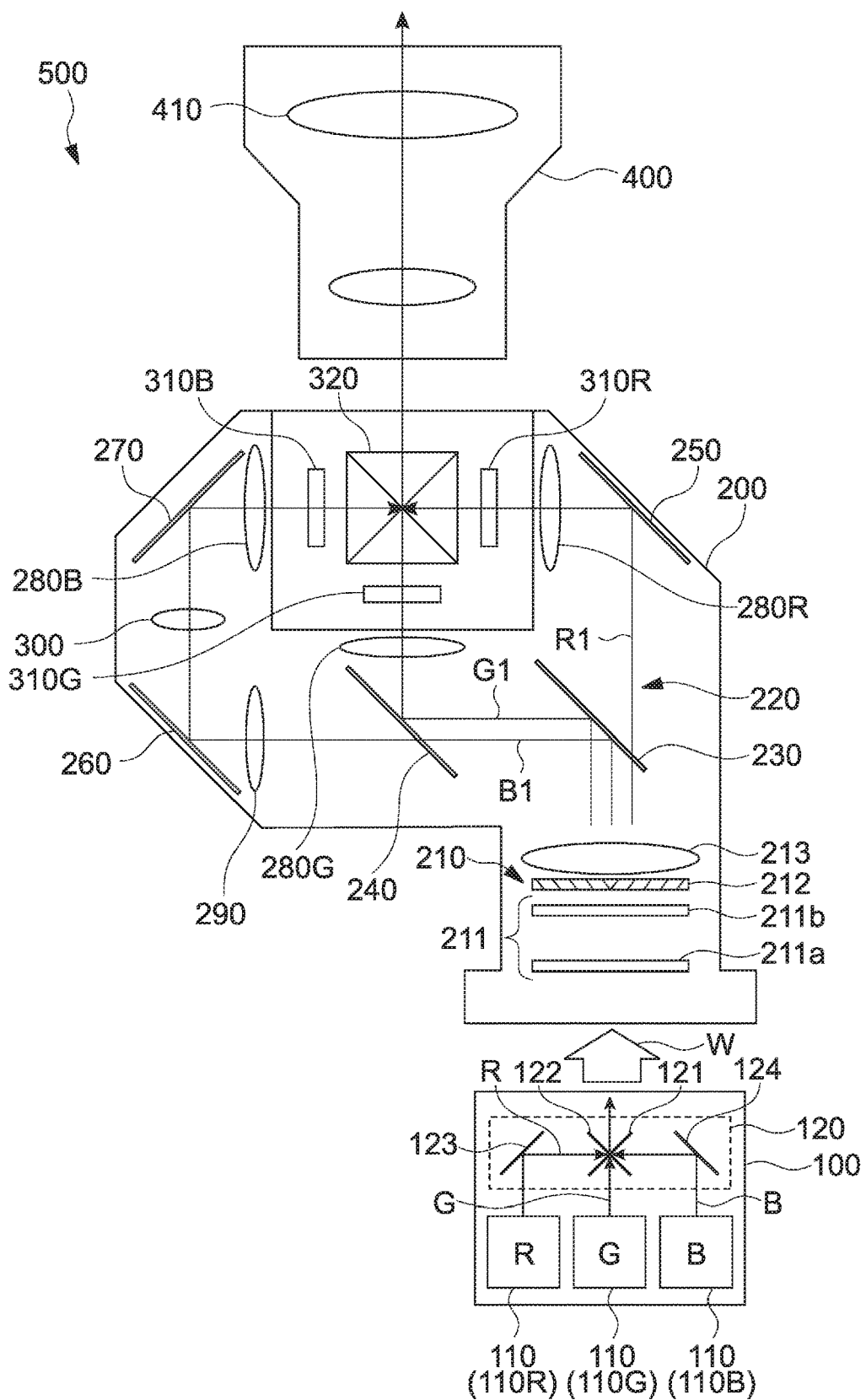
FIG. 1 is a schematic view showing a configuration example of an image display apparatus according to a first embodiment.

FIG. 1 is a schematic view showing a configuration example of an image display apparatus according to a first embodiment of the present technology. An image display apparatus 500 is used as, for example, a projector for presentation or digital cinema. The present technology that will be described below is also applicable to image display apparatuses for other purposes.

The image display apparatus 500 has a light source device 100, an image generation system 200, and a projection system 400. The light source device 100 emits white light W to the image generation system 200. The light source device 100 will be described in detail later.

The image generation system 200 corresponds to an image generation unit and generates an image on the basis of the white light W emitted from the light source device 100. The image generation system 200 has an integrator optical system 210 and an illumination optical system 220. The integrator optical system 210 has an integrator element 211, a polarization conversion element 212, and a condensing lens 213.

The integrator element 211 has a first flyeye lens 211a having a plurality of two-dimensionally arrayed micro lenses and a second flyeye lens 211b having a plurality of micro lenses arrayed to separately correspond to the plurality of micro lenses.

The white light W incident on the integrator element 211 is divided into a plurality of light fluxes by the micro lenses of the first flyeye lens 211a and forms images on the respective micro lenses provided in the second flyeye lens 211b. The respective micro lenses of the second flyeye lens 211b function as secondary light sources and emit a plurality of pieces of parallel light having the same brightness to the subsequent polarization conversion element 212.

The polarization conversion element 212 has the function of making the polarization state of the incident light incident via the integrator element 211 uniform. The light having passed through the polarization conversion element 212 is emitted to the illumination optical system 220 via the condensing lens 213.

The integrator optical system 210 has the function of putting the white light W directed to the illumination optical system 220 in a uniform brightness distribution as a whole and adjusting the white light W into light having a uniformized polarization state. The specific configurations of the integrator optical system 210 are not limited.

The illumination optical system 220 includes dichroic mirrors 230 and 240, mirrors 250, 260, and 270, field lenses 280R, 280G, and 280B, relay lenses 290 and 300, liquid crystal light valves 310R, 310G, and 310B serving as image generation elements, and a dichroic prism 320.

The dichroic mirrors 230 and 240 have the property of selectively reflecting colored light in a prescribed wavelength range and causing light in other wavelength ranges to pass therethrough. The dichroic mirror 230 selectively reflects green light G1 and blue light B1 included in the white light W and causes red light R1 included in the white light W to pass therethrough. The dichroic mirror 240 selectively reflects the green light G1 reflected by the dichroic mirror 230 and causes the blue light B1 to pass therethrough. Thus, the different colored light is each separated into a different light path. Note that configurations, used devices, or the like for separating the respective RGB colored light are not limited.

The separated red light R1 is reflected by the mirror 250, parallelized by the field lens 280R, and incident on the liquid crystal light valve 310R for red light modulation. The green light G1 is parallelized by the field lens 280G and incident on the liquid crystal light valve 310G for green light modulation. The blue light B1 is reflected by the mirror 260 via the relay lens 290 and reflected by the mirror 270 via the relay lens 300. The blue light B1 reflected by the mirror 270 is parallelized by the field lens 280B and then incident on the liquid crystal light valve 310B for blue light modulation.

The liquid crystal light valves 310R, 310G, and 310B are electrically connected to a signal source (for example, a PC or the like) not shown that supplies image signals including image information. The liquid crystal light valves 310R, 310G, and 310B modulate the incident light for each pixel on the basis of the supplied image signals of the respective colors and generate a red image, a green image, and a blue image, respectively. The modulated light (the formed images) of the respective colors is incident on the dichroic prism 320 to be synthesized together. The dichroic prism 320 superimposes the light of the respective colors incident from the three directions to be synthesized together and emits the synthesized light to the projection system 400.

The projection system 400 projects the image generated by the image generation system 200. The projection system 400 has a plurality of lenses 410 or the like and projects the light synthesized by the dichroic prism 320 onto a screen or the like not shown. Thus, a full-color image is displayed. The specific configurations of the projection system 400 are not limited.

[Light Source Device]

The light source device 100 has a red light source unit 110R, a green light source unit 110G, a blue light source unit 110B, and a photosynthesis unit 120. The red light source unit 110R emits red light R, and the green light source unit 1106 emits green light G. The blue light source unit 110B emits blue light B. The respective light source units 110 have substantially the same configurations, and the configurations will be described in detail later.

The photosynthesis unit 120 synthesizes the red light R, the green light G, and the blue light B irradiated from the respective light source unit 110 together to generate the white light W. As shown in FIG. 1, the photosynthesis unit 120 has dichroic mirrors 121 and 122 and mirrors 123 and 124. The dichroic mirror 121 selectively reflects the red light R and causes the green light G and the blue light B to pass therethrough. The dichroic mirror 122 selectively reflects the blue light B and causes the green light G and the red light R to pass therethrough.

The dichroic mirrors 121 and 122 are arranged on the light path of the green light G emitted from the green light source unit 110G. The green light G emitted from the green light source unit 110G passes through the dichroic mirrors 121 and 122 to travel.

The mirror 123 reflects the red light R emitted from the red light source unit 110R toward the dichroic mirror 121. The red light R having been reflected by the mirror 123 is reflected by the dichroic mirror 121 along the light path of the green light G.

The mirror 124 reflects the blue light B emitted from the blue light source unit 110B toward the dichroic mirror 122. The blue light B having been reflected by the mirror 124 is reflected by the dichroic mirror 122 along the light path of the green light G.

Thus, the red light R, the green light G, and the blue light B are synthesized together to generate the white light W. The generated white light W is emitted to the image generation system 200. Note that methods or configurations for synthesizing the red light R, the green light G, and the blue light B together to generate the white light W are not limited.

Figure 2:
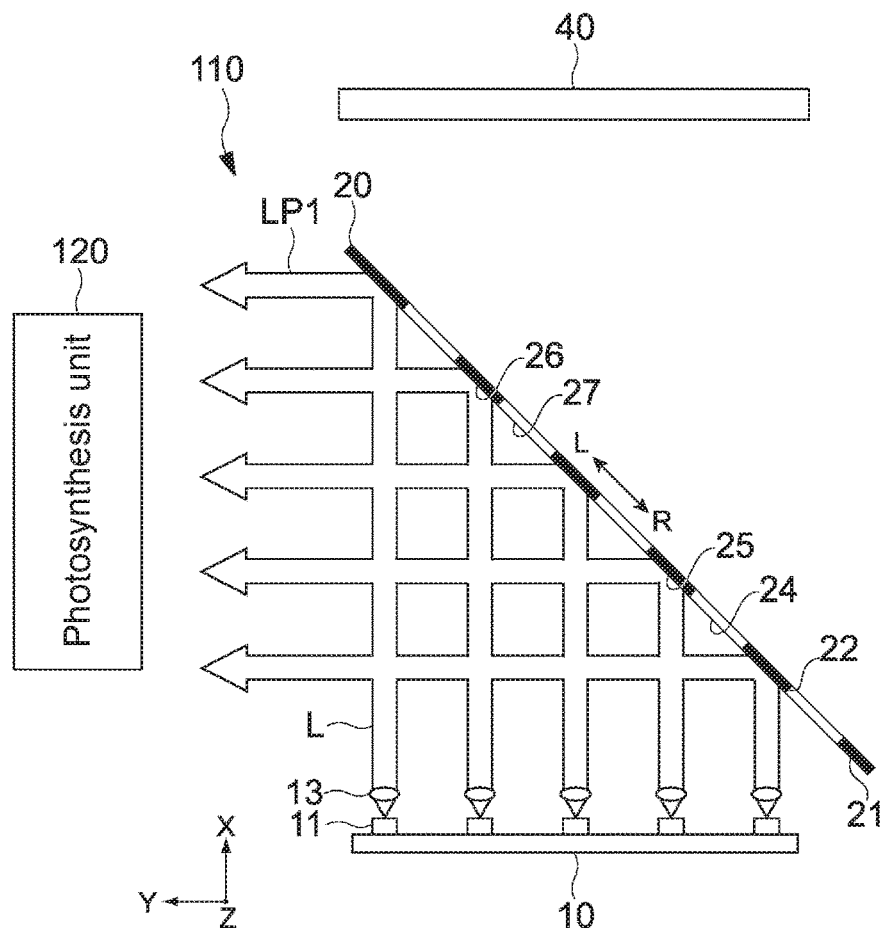
FIG. 2 is a schematic view showing a configuration example of a light source unit.

FIG. 2 is a schematic view showing a configuration example of the light source unit 110. Here, a state in which the light source unit 110 is placed on a horizontal plane (XY plane) is shown in the figure to facilitate the understanding of a description. That is, FIG. 2 corresponds to a schematic view obtained when the light source unit 110 is viewed from above, and a Z direction is the height direction of the light source unit 110. Further, a Y direction corresponds to the emission direction of light emitted from the light source unit 110 to the photosynthesis unit 120 (corresponds to the upward direction of FIG. 1).

Of course, the light source unit 110 may be arranged to be inclined with respect to a horizontal direction. That is, the entire unit can be arranged to be inclined with the emission direction (Y direction) being used as a reference.

As shown in FIG. 2, the light source unit 110 has a light source section 10, a reflection mirror 20, a sensor section 40, and a movement mechanism (not shown). In the present embodiment, the light source section 10 and the sensor section 40 are arranged with a prescribed interval placed therebetween so as to face each other in an X direction. Between the light source section 10 and the sensor section 40, the reflection mirror 20 is arranged so as to cross the X direction at an angle of approximately 45°.

Figure 3:
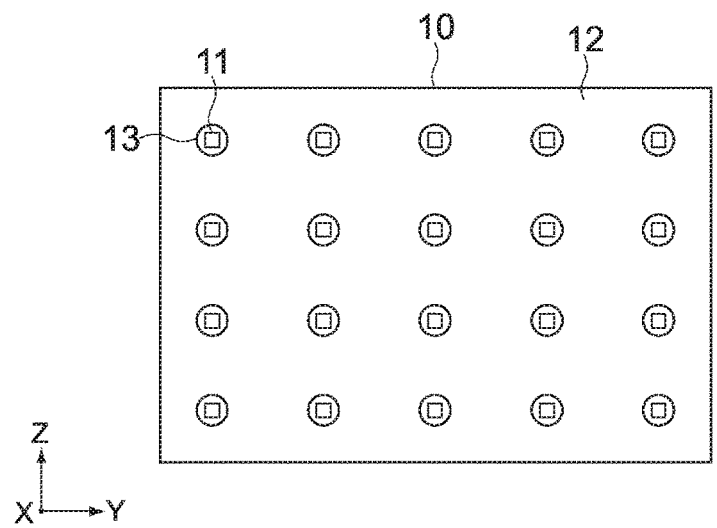
FIG. 3 is a schematic view showing a configuration example of a light source section and is a front view of the light source section when viewed from the side of a reflection mirror.

FIG. 3 is a schematic view showing a configuration example of the light source section 10 and is a front view of the light source section 10 when viewed from the side of the reflection mirror 20. As shown in FIGS. 2 and 3, an array light source in which a plurality of laser light sources 11 is arranged in an array form is used as the light source section 10. In the present embodiment, totally 20 (four in length× five in width) laser light sources 11 are arranged with respect to a mounting substrate 12. The light source section 10 is arranged so that a length direction in which the four laser light sources 11 are arranged side by side becomes the Z direction, and so that a width direction in which the five laser light sources 11 are arranged side by side becomes the Y direction.

The laser light sources 11 are laser diodes capable of oscillating laser light having the peak wavelength of light emission intensity within wavelength ranges corresponding to the respective colors. Red laser light sources are arranged in the red light source unit 110R, green laser light sources are arranged in the green light source unit 110G, and blue laser light sources are arranged in the blue laser light source 110B.

On the front sides of the respective laser light sources 11, collimator lenses 13 that substantially parallelize laser light L emitted from the laser light sources 11 are arranged. Accordingly, the laser light L is turned into a parallel light flux having a prescribed cross-sectional area and emitted toward the reflection mirror 20 along the X direction. Note that the laser light sources 11 and the collimator lenses 13 may be integrally configured as units, and that the units may be arranged in an array form.

In the present embodiment, the laser light sources 11 correspond to light sources. Further, the laser light L corresponds to emitted light. The number of the laser light sources 11, the intervals (pitches) between the laser light sources 11, the cross-sectional area of parallel light fluxes, or the like may be arbitrarily set, and the present technology is applicable to any case. Further, other solid light sources such as LEDs may be used instead of the laser light sources 11. Further, even when parallel light fluxes are generated using mercury lamps, xenon lamps, or the like instead of solid light sources, the present technology is also applicable.

Figure 4:
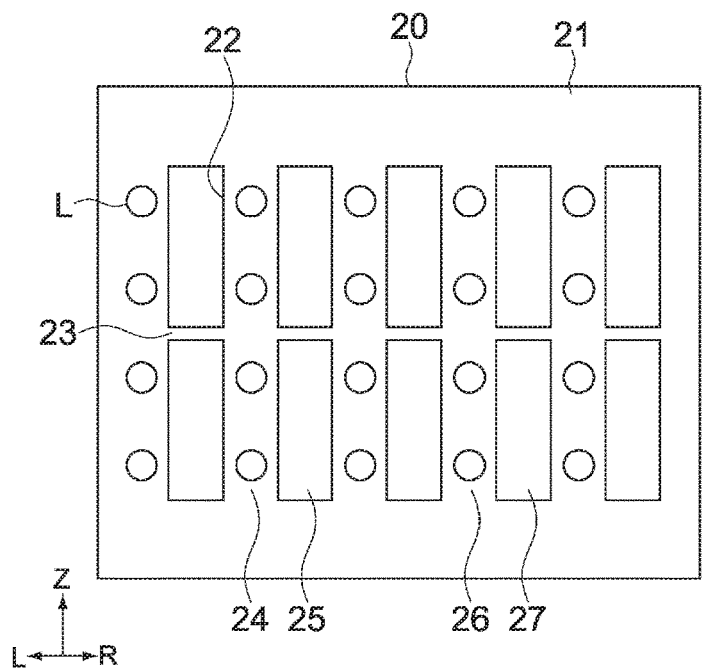
FIG. 4 is a schematic view showing a configuration example of the reflection mirror and is a front view of the reflection mirror when viewed from a side from which laser light is emitted.

FIG. 4 is a schematic view showing a configuration example of the reflection mirror 20 and is a front view of the reflection mirror 20 when viewed from a side from which the laser light L is emitted. In FIG. 4, an LR direction corresponds to an LR direction in FIG. 2 and is a direction in which the reflection mirror 20 is arranged. That is, the LR direction is parallel to the XY plane and is a direction crossing the X direction at an angle of approximately 45°. Further, FIG. 4 schematically shows the light fluxes of the laser light L incident on the reflection mirror 20.

The reflection mirror 20 is made of at least a light reflection member having light reflectivity at its incident surface 21 on which the laser light L is incident. Further, as shown in FIGS. 2 and 4, a plurality of light transmission holes 22 is formed on the reflection mirror 20. The plurality of light transmission holes 22 is formed on, for example, the light reflection member of the incident surface 21 onto which reflection coating by silver, chrome, aluminum, or the like has been applied. Alternatively, the light transmission holes 22 may be formed on a light reflection member made of metal such as aluminum. Besides, arbitrary configurations may be employed.

The plurality of light transmission holes 22 is formed corresponding to the plurality of laser light sources 11 of the light source section 10. In the present embodiment, totally ten light transmission holes 22 are formed so that five sets of two light transmission holes 22 adjacent to each other along the Z direction are arranged side by side at a prescribed interval along the LR direction.

The respective two light transmission holes 22 arranged side by side in the Z direction are formed over a range covering the light fluxes of the four laser light L arranged side by side in the Z direction. Further, the width of the light transmission holes 22 in the LR direction is set at a size at which the light fluxes of the laser light L incident at an angle of approximately 45° fall within the light transmission holes 22. That is, the size of the light transmission holes 22 is formed at a size at which the light fluxes of the laser light L can be substantially transmitted when the laser light L is emitted to the light transmission holes 22 (see FIG. 6).

Note that rib parts 23 between the respective two light transmission holes 22 arranged side by side along the Z direction are formed at a size at which the transmission of the laser light L is not disturbed. The intensity of the reflection mirror 20 can be improved by the rib parts 23. Instead of the rib parts 23, one light transmission hole may be formed along the Z direction.

The interval between the light transmission holes 22 arranged side by side along the LR direction is set at a size at which the light fluxes of the laser light L incident at an angle of approximately 45° fall within the light transmission holes 22. That is, as shown in FIGS. 2 and 4, the interval between the light transmission holes 22 is set at a size at which it is possible to substantially reflect the light fluxes of the laser light L. Typically, the width of the light transmission holes 22 and the interval between the light transmission holes 22 in the LR direction are set at sizes approximately equal to each other.

In the present embodiment, a part of the reflection mirror 20 on which the light transmission holes 22 are not formed functions as a light reflection part. Further, the light transmission holes 22 formed on the reflection mirror 20 function as a light transmission part. In the incident surface 21 shown in FIG. 4, an entire region in which the light transmission holes 22 are not formed serves as a light reflection surface 24. In the incident surface 21, an entire region in which the light transmission holes 22 are formed serves as a light transmission surface 25.

The light reflection surface 24 and the light transmission surface 25 are at least partially adjacent to each other. In the present embodiment, all the edge parts of the light transmission surface 25 are adjacent to the light reflection surface 24. Thus, it becomes possible to substantially reduce a movement amount of the reflection mirror 20 to switch between a first state and a second state that will be described later. Of course, another effect may be produced.

Further, the light reflection surface 24 has a plurality of light reflection regions 26 provided corresponding to the plurality of laser light sources 11. In the present embodiment, five regions, that is, the regions between the light transmission holes 22 and a region at an end on an L side (left side in FIG. 4) in the LR direction serve as the light reflection regions 26.

The light transmission surface 25 has a plurality of light transmission regions 27 provided corresponding to the plurality of laser light sources 11. In the present embodiment, ten regions in which the light transmission holes 22 are formed directly correspond to the light transmission regions 27.

Each of the plurality of light transmission regions 27 is formed to be adjacent to at least one of the light reflection regions 26. In the present embodiment, two light transmission regions 27 arranged side by side in the Z direction and the light reflection regions 26 are alternately formed along the LR direction. This point is also advantageous for reducing a movement amount of the reflection mirror 20 to switch between the first state and the second state.

In the present embodiment, the reflection mirror 20 corresponds to an optical element including the light reflection part and the light transmission part provided at a position different from the position of the light reflection part.

The sensor section 40 is capable of detecting the state of the laser light L by receiving the laser light L. The state of the laser light L includes, for example, brightness (intensity), chromaticity, the size (cross-sectional area) of light fluxes, or the like. In the present embodiment, the sensor section 40 is configured so that the detection of all the laser light L is allowed when the laser light from the plurality of laser light sources 11 passes through the reflection mirror 20 (see FIG. 6).

For example, an array sensor in which a plurality of sensors is arranged at positions at which the light fluxes of 20 laser light passing through the reflection mirror 20 are incident is used. As the sensors, brightness sensors, chromaticity sensors, or the like are, for example, used. Thus, it becomes possible to detect the states of all the laser light L and determine the states of the respective laser light sources 11.

Alternatively, an imaging element capable of collectively capturing images of the light fluxes of the 20 laser light L may be used as the sensor section 40. It is possible to collectively detect the states of the respective laser light L on the basis of a captured image signal. Besides, the specific configurations of the sensor section 40 are not limited and may be arbitrarily designed.

The movement mechanism movably holds the reflection mirror 20 and moves the reflection mirror 20 in parallel along the LR direction. The specific configurations of the movement mechanism are not limited. An arbitrary actuator mechanism constituted of, for example, a driving source such as a stepping motor and a linear motor, a ball screw mechanism, a rack and pinion mechanism, a belt mechanism, a guide mechanism, or the like may be used. In the present embodiment, the movement mechanism corresponds to a holding section.

[Movement Control of Reflection Mirror]

In the light source unit 110 according to the present embodiment, it is possible to move the reflection mirror 20 in parallel by the movement mechanism to switch the light paths of the laser light L emitted from the laser light sources 11. Specifically, light paths LP1 for projecting an image and light paths LP2 for examining the laser light L are switched to each other.

FIGS. 2 and 4 are views showing a case in which the light paths LP1 for projecting an image are formed. The reflection mirror 20 is moved so that the light reflection regions 26 functioning as the light reflection part of the reflection mirror 20 are arranged on the light paths of the laser light L. The laser light L having been reflected by the light reflection regions 26 is emitted along a direction in which the laser light L crosses the light reflection regions 22 at an angle of approximately 90°. That is, light paths extending in the X direction from the laser light sources 11 to the light reflection regions 26 and extending in the Y direction after folded by the light reflection regions 26 are formed as the light paths LP1 for projecting an image.

In the present embodiment, the laser light L reflected by the light reflection regions 26 corresponds to first emitted light. In the present embodiment, an image is generated by the image generation system 200 on the basis of the first emitted light.

Figure 5:
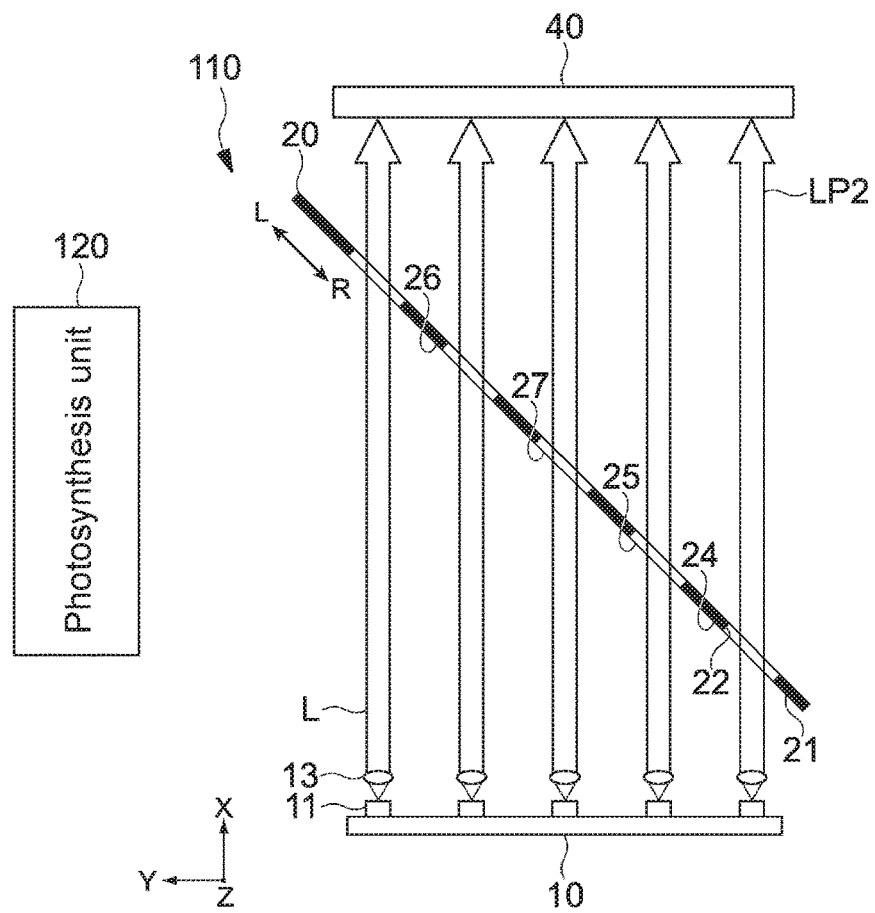
FIG. 5 is a schematic view of the optical unit in a case in which light paths for examining the laser light are formed.
Figure 6:
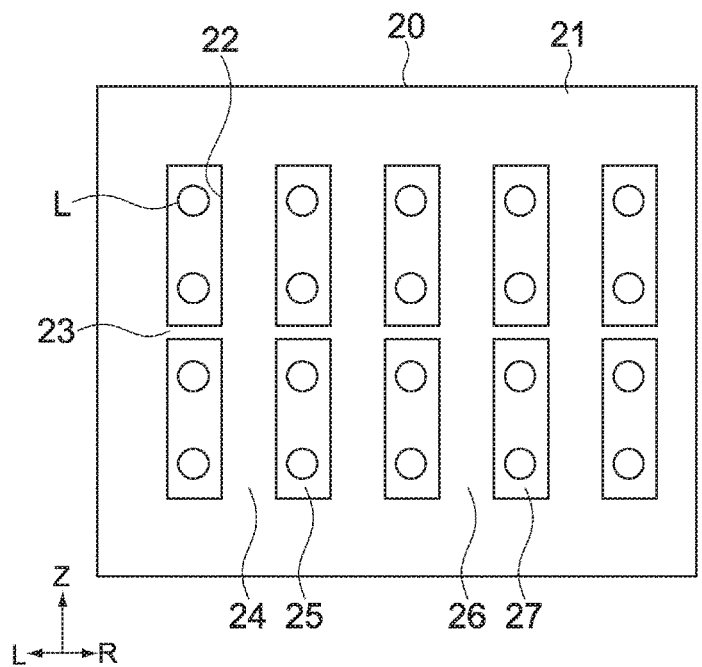
FIG. 6 is a schematic view of the reflection mirror in a case in which the light paths for examining the laser light are formed.

FIGS. 5 and 6 are views showing a case in which the light paths LP2 for examining the laser light L are formed. The reflection mirror 27 is moved so that the light transmission regions 20 functioning as the light transmission part of the reflection mirror 20 are arranged on the light paths of the laser light L. That is, from the state shown in FIGS. 2 and 4, the reflection mirror 20 is moved by the width of the light transmission holes 22 (substantially equal to the width of the light reflection regions 26) toward the L side along the LR direction. That is, the reflection mirror 20 is moved by one pitch of the laser light sources 11.

The laser light L having been emitted from the laser light sources 11 travels along the X direction after passing through the light transmission regions 27 and is incident on the sensor section 40. That is, light paths extending in the X direction from the laser light sources 11 to the sensor section 40 are formed as the light paths LP2 for examining the laser light L.

In the present embodiment, the laser light L passing through the light transmission regions 27 corresponds to second emitted light. The second emitted light is laser light L not used for image generation by the image generation system 200 and is light of which the state is detected by the sensor section 40.

Further, in the present embodiment, a state in which the light paths LP1 for projecting an image are formed corresponds to the first state. A state in which the light paths LP2 for examining the laser light L are formed corresponds to the second state. By appropriately moving the reflection mirror 20 by the width of the light transmission holes 22 along the LR direction, it becomes possible to easily switch between the first state and the second state. As a result, it becomes possible to emit the laser light L in directions different from each other by approximately 90° in a switching manner.

For example, the first state in which the light paths LP1 for projecting an image are formed is set as a basic state. Then, at a timing at which image projection is not being performed, the first state is appropriately switched to the second state in which the light paths LP2 for examining the laser light L are formed to detect the state of the laser light L. The sensing of the laser light L may be automatically performed on a regular basis, or may be performed according to instructions from a user. Further, during a mode in which image projection is being performed, the sensing of the laser light L may be performed according to a timing at which the image projection is suspended.

Of course, an image may be generated on the basis of the laser light L (first emitted light) passing through the light transmission regions 27. Then, the state of the laser light L (second emitted light) having been reflected by the light reflection regions 26 may be detected by the sensor section 40. In this case, the positions of the photosynthesis unit 120 and the sensor section 40 shown in FIGS. 2 and 5 are reversed, and the light paths LP1 for projecting an image are used as the light paths for examining the laser light L. The light paths LP2 for examining the laser light L shown in FIG. 5 are used as the light paths LP1 for projecting an image.

Figure 7:
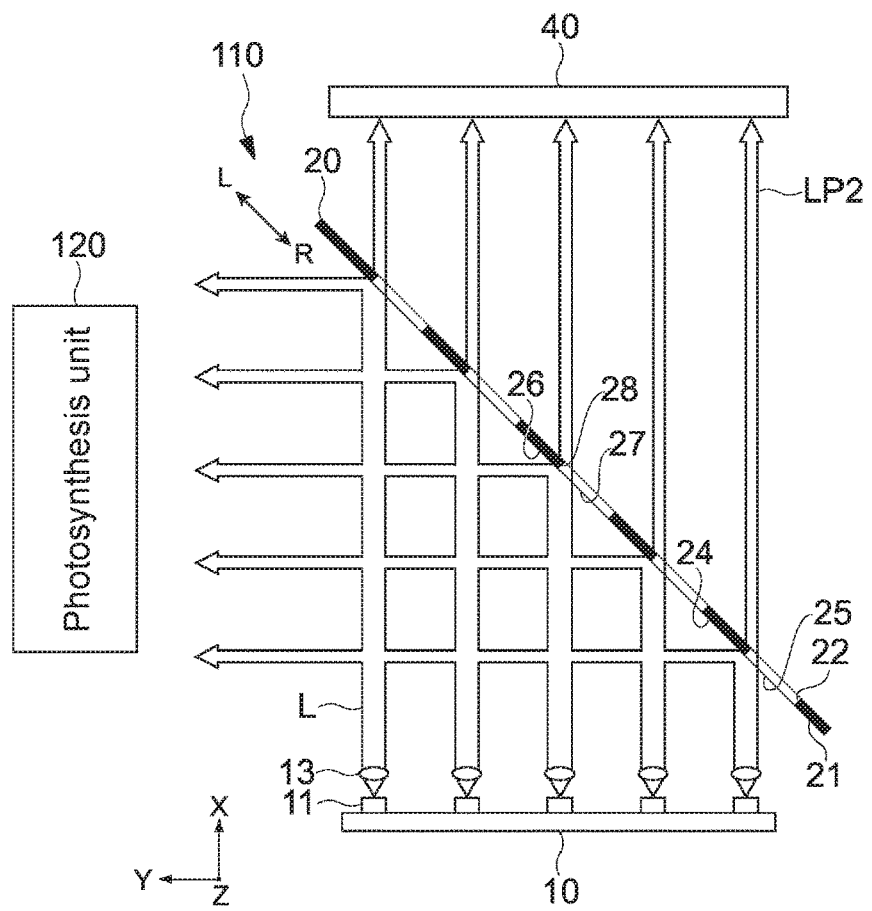
FIG. 7 is a schematic view showing another example of the movement control of the reflection mirror.

FIG. 7 is a schematic view showing another example of the movement control of the reflection mirror 20. As shown in FIG. 7, the reflection mirror 20 is moved so that both a part of the light reflection surface 24 functioning as the light reflection part and a part of the light transmission surface 25 functioning as the light transmission part are arranged on the light paths of the laser light L. Typically, edge parts 28 of the light transmission holes 22 (corresponding to the edge parts of the light reflection surface 24) are arranged on the light paths of the laser light L.

A part of the light fluxes of the laser light L is reflected by a part (that will be described as dividing reflection regions) of the light reflection surface 24 arranged on the light paths, and emitted along the Y direction. A part of the light fluxes of the laser light L passes through a part (that will be described as dividing transmission regions) of the light transmission surface 25 arranged on the light paths, and emitted along the X direction. That is, the laser light L is divided and emitted in each of the Y direction and the X direction on the basis of the edge parts 28 of the light transmission holes 22 arranged on the light paths.

Figure 8:
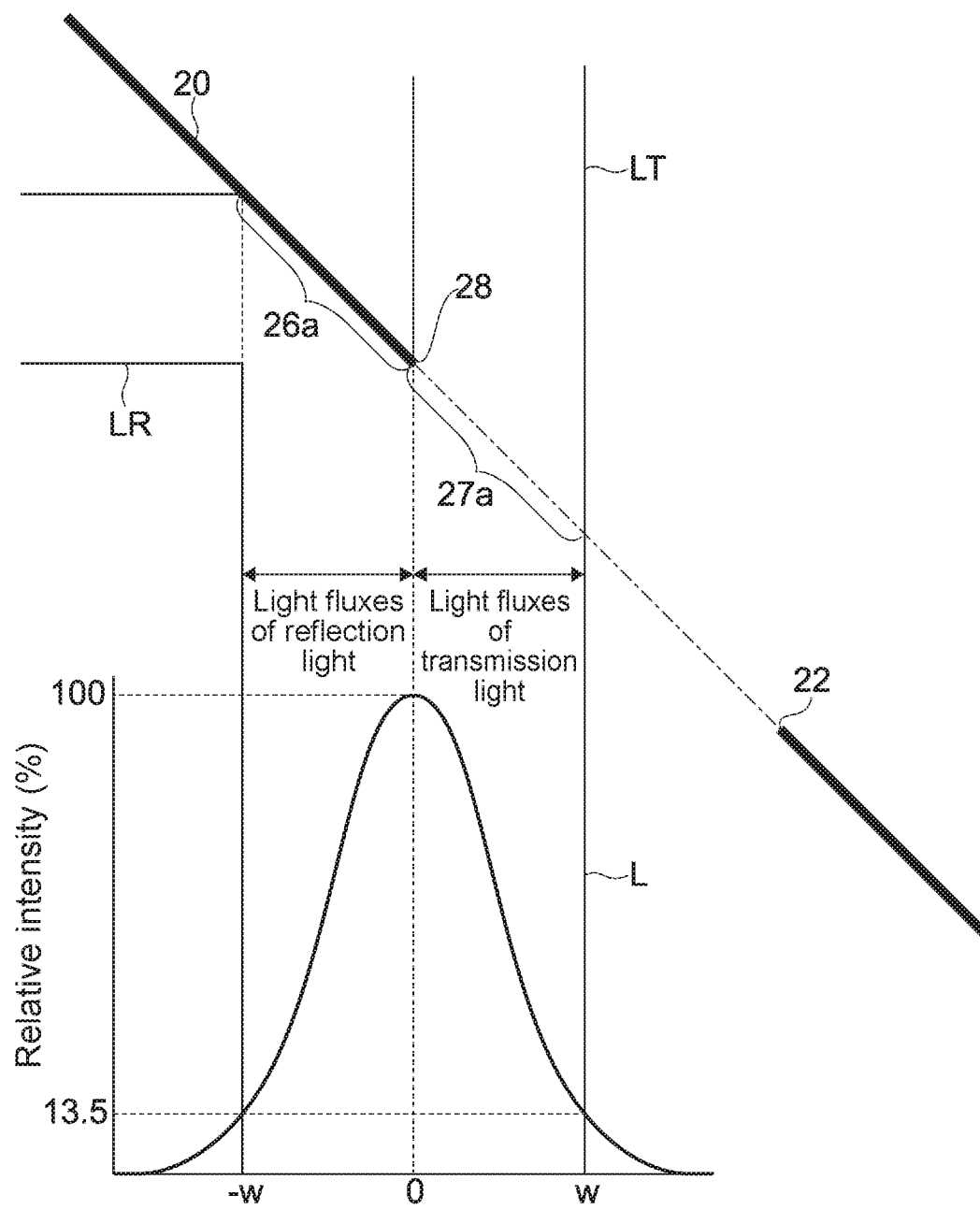
FIG. 8 is a schematic view for describing the position of the reflection mirror.

FIG. 8 is a schematic view for describing the position of the reflection mirror 20. As shown in, for example, FIG. 8, the reflection mirror 20 is moved so that the size of the dividing reflection regions 26a and the size of the dividing transmission regions 27a are made substantially the same. That is, the reflection mirror 20 is moved so that the edge parts 28 of the light transmission holes 22 are positioned at substantially the centers of the light fluxes of the laser light L.

Thus, the size (cross-sectional area) of the light fluxes of divided light LR reflected in the X direction and the size (cross-sectional area) of the light fluxes of transmission light LT emitted in the Y direction can be made substantially the same. Further, the intensity of the divided light LR and the intensity of the transmission light LT can be made substantially the same. That is, it becomes possible to emit the laser light LR and LT having substantially the same light flux and the same intensity in the two directions in a divided manner.

In addition, by controlling the ratio of the size of the divided reflection regions 26a to the size of the divided transmission regions 27a, it becomes possible to control each of the size and the intensity of the light fluxes of the reflection light LR and the transmission light LT. This corresponds to the control of the positions of the edge parts 28 of the light transmission holes 22 on the light paths of the laser light L.

Generally, the intensity distribution of the cross section of a Gaussian beam such as laser light is a Gaussian distribution as shown in FIG. 8. The beam diameter (the size of the light flux) of the Gaussian beam is determined according to a range in which the radiation intensity of the beam becomes about 13.5% or more of its peak value.

On the basis of, for example, such a Gaussian distribution, the positions of the edge parts 28 of the light transmission holes 22 are only required to be controlled so that the reflection light LR and the transmission light LT having a desired beam diameter and intensity are obtained. For example, by making the edge parts 28 of the light transmission holes 22 come close to a W side in the graph to expand the divided reflection regions 26a, it becomes possible to increase the beam diameter and the intensity of the reflection light LR. On the other hand, by making the edge parts 28 of the light transmission holes 22 come close to a −W side in the graph to expand the divided transmission regions 27a, it becomes possible to increase the beam diameter and the intensity of the transmission light LT. Note that the shape of the edge parts 28 of the light transmission holes 22 may be appropriately adjusted to divide the reflection light LR and the transmission light LT with high accuracy.

Table information or the like showing the relationship between light characteristics including the intensity or the like of the divided light LR and the transmission light LT generated may be stored in a memory or the like. Then, the reflection mirror 20 may be moved so that the divided light LR and the transmission light LT having desired light characteristics are generated on the basis of the table information or the like. The table information or the like is generated during, for example, the manufacturing of the image display apparatus 500. Further, the table information may be appropriately corrected by calibration or the like.

By dividing the laser light L, it is possible to simultaneously perform, for example, image projection and the examination of the laser light L. On the basis of, for example, a brightness value of a projected image, a light amount (intensity) of the laser light L required for image projection is calculated. When the calculated light amount is small, the division of the reflection light LR and the transmission light LT is performed and an image is generated by the reflection light LR. Further, the examination of the laser light L is performed by the transmission light LT. It is also possible to perform such control. Besides, arbitrary control using the reflection light LR and the transmission light LT may be performed.

As described above, the image display apparatus 500 according to the present embodiment uses the reflection mirror 200 provided with the light reflection part including the light reflection regions 26 and the light transmission part including the light transmission regions 27. Then, the first state in which the light reflection regions 26 are arranged on the light paths of the laser light L and the second state in which the light transmission regions 27 are arranged on the light paths are switched to each other by the movement mechanism. Thus, it is possible to easily change the light paths of the laser light L. Further, it is possible to reduce a movement amount of the reflection mirror 20 and substantially reduce the upsize of the apparatus.

For example, it is assumed that a whole surface mirror of which the whole surface serves as a reflection surface is used instead of the reflection mirror 20 having the light transmission holes 22 shown in FIGS. 2 and 5. In this case, in order to change the light paths of the laser light L and make the laser light L incident on the sensor section 40, the whole surface mirror is required to be moved to the outside of the light paths.

For example, the whole surface mirror arranged at an angle of approximately 45° with respect to the X direction is moved rightward in parallel along the Y direction. Alternatively, the whole surface mirror is rotationally moved until its upper left end is positioned outside the light paths about the lower right end of the whole surface mirror. In any case, large space is required to move the whole surface mirror, which also causes the upsize of the movement mechanism. As a result, the upsize of the apparatus is caused.

Further, a method in which a sensor section itself is moved onto the light paths of the laser light L to perform the sensing of the laser light L is also assumed. In this case as well, large space for moving the sensor section onto the light paths is required, which also causes the upsize of the movement mechanism. Accordingly, the upsize of the apparatus is caused.

In the light source unit 110 according to the present embodiment, the reflection mirror 20 is moved in parallel by the distance corresponding to one pitch between the plurality of laser light sources 11 arranged in the light source section 10, that is, by the distance of the width of the light transmission holes 22. By the parallel movement for the very short distance, the light paths LP1 for projecting an image and the light paths LP2 for examining the laser light L are easily switched to each other. As a result, it becomes possible to substantially reduce space for moving the reflection mirror 20 and realize the movement mechanism with the simple configurations. Accordingly, it becomes possible to substantially reduce the upsize of the image display apparatus 500.

Further, it becomes possible to detect the state of the laser light L on a regular basis at a desired timing and determine the states of the respective laser light sources 11. Thus, it becomes possible to appropriately prepare new laser light sources 11 for replacement before the laser light sources 11 are completely broken down. That is, by predicting a fault and preparing a replacement component in advance, it becomes possible to reduce a period required for repairment.

Further, since the monitoring of the states of the laser light sources 11 is allowed on a regular basis, it is also possible to notify information regarding the state of the light source section 10 on the basis of detection results by the sensor section 40. The information regarding the state of the light source section 10 includes, for example, information regarding the brightness, the chromaticity, and the cross-sectional area of the light fluxes of the respective laser light sources 11. Besides, information regarding the degradation degrees of the respective laser light sources 11 and information regarding the maintenance, the use method, or the like of the image display apparatus 500 are also included. It becomes possible for a user to make an appropriate response such as improving the use environment of the image display apparatus 500 and improving the use method or the like of the image display apparatus 500 on the basis of notified information.

Examples of a method for notifying information regarding the state of the light source section 10 include the projection of a notification image containing a prescribed GUI, the display of an alert or the like on an operation display provided in the image display apparatus 500, and the output of a notification content through voice. It is possible to realize a notification unit relating to the present technology with arbitrary configurations capable of realizing such notification methods.

In a case in which the image display apparatus 500 is used in a theater or the like, the occurrence and prolongation of downtime due to a failure or the like in the image display apparatus 500 has a crucial influence on business. A reduction in repairment period, an improvement in use environment, or the like is realized by the use of the present technology, which makes it is possible to substantially prevent the occurrence and prolongation of downtime.

Second Embodiment

The light source unit of a second embodiment according to the present technology will be described. Hereinafter, the descriptions of portions having the same configurations and functions as those of the image display apparatus 500 and the light source unit 110 described in the above embodiment will be omitted or simplified.

Figure 9:
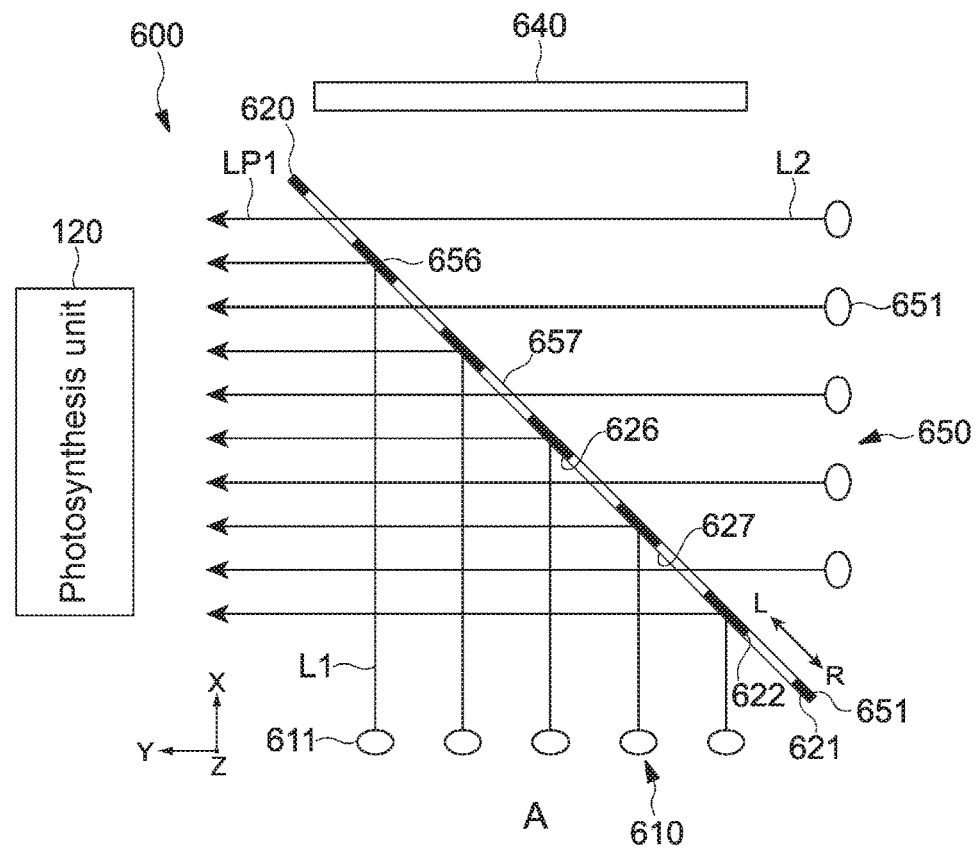
FIGS. 9A and 9B are schematic views showing a configuration example of a light source unit according to a second embodiment.
Figure 9:
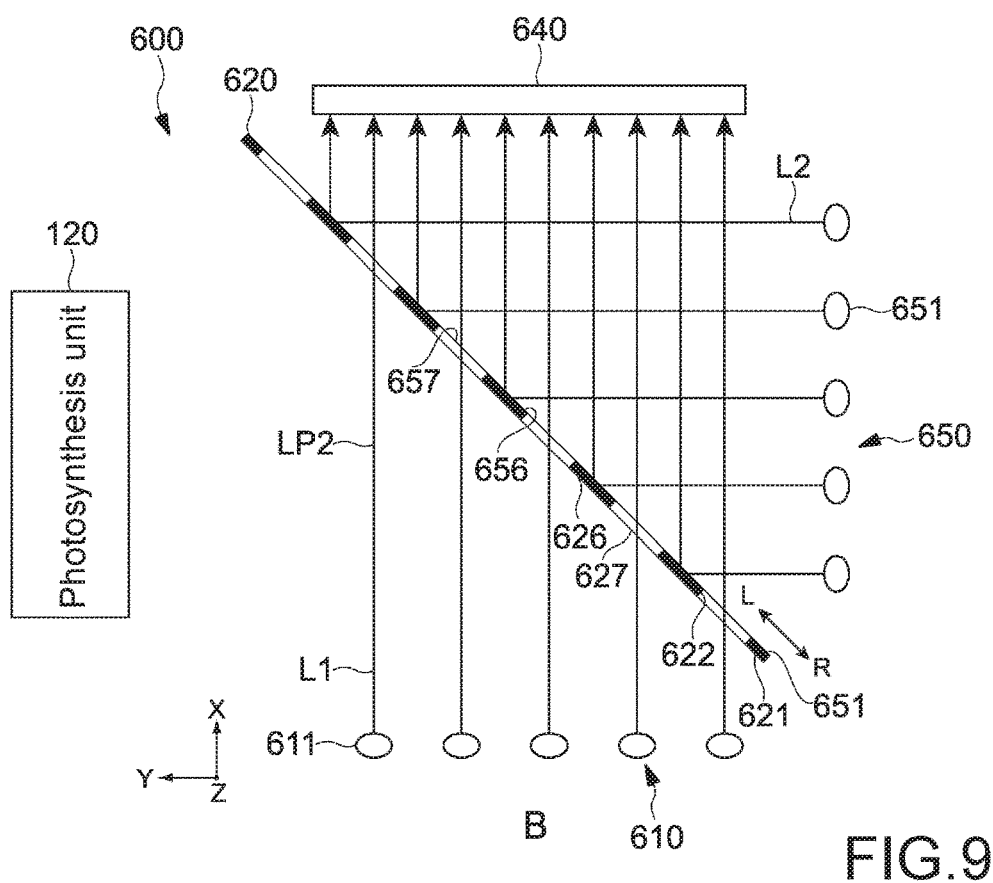

FIGS. 9A and 9B are schematic views showing a configuration example of a light source unit 600 according to the present embodiment. FIG. 9A is a view showing a case in which light paths LP1 for projecting an image are formed. FIG. 9B is a view showing a case in which light paths LP2 for examining laser light are formed.

As shown in FIGS. 9A and 9B, the light source unit 600 has a first light source section 610, a second light source section 650, a reflection mirror 620, a sensor section 640, and a movement mechanism (not shown). The first light source section 610 has substantially the same configuration as that of the light source section 10 described in the first embodiment. From a plurality of laser light sources 611 of the first light source section 610, laser light L1 is emitted to the reflection mirror 620 along an X direction.

The second light source section 650 is an array light source having substantially the same configuration as that of the first light source section 610 and is arranged along the X direction. From a plurality of laser light sources 651 of the second light source section 650, laser light L2 is emitted to the reflection mirror 620 along a Y direction. That is, the second light source section 650 is arranged so that the emission direction of the second light source section 650 and the emission direction of the first light source section 610 are substantially orthogonal to each other. Note that the illustration of the laser light sources 611 and 651 and the laser light L1 and L2 is simplified in FIGS. 9A and 9B.

In the present embodiment, the first light source section 610 and the laser light L1 correspond to a light source section and emitted light, respectively. The second light source section 650 and the laser light L2 correspond to the other light source section and the other emitted light, respectively. Further, the X direction that is the emission direction of the first light source section 610 corresponds to a first direction. The Y direction that is the emission direction of the second light source section 650 corresponds to a second direction.

Figure 10:
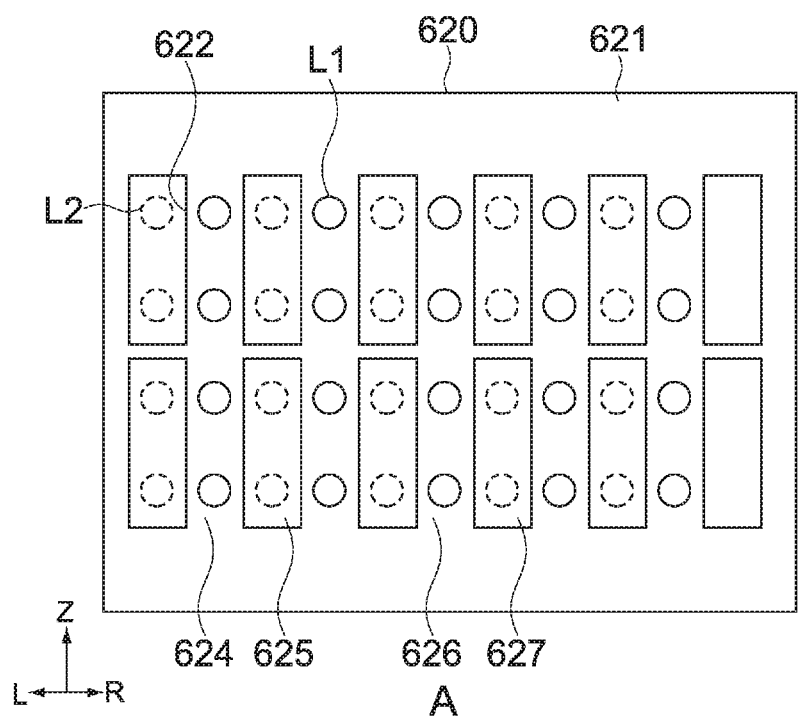
FIGS. 10A and 10B are views showing a configuration example of a reflection mirror.
Figure 10:
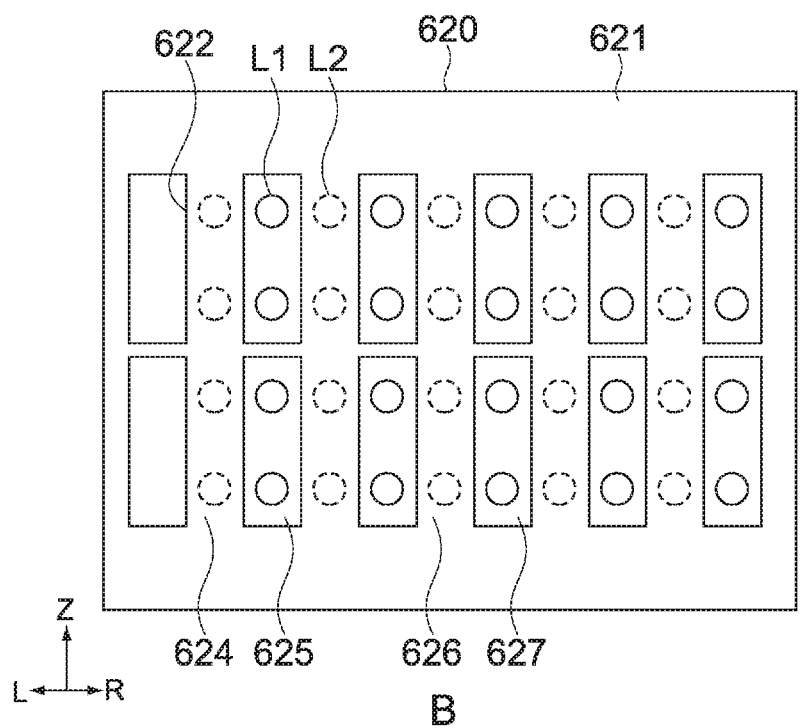

FIGS. 10A and 10B and FIGS. 11A and 11B are views showing a configuration example of the reflection mirror 620. FIGS. 10A and 10B are schematic views showing a first incident surface 621 on which the laser light L1 emitted from the first light source section 610 is incident. FIG. 10A is a view showing a case in which the light paths LP1 for projecting an image are formed. FIG. 10B is a view showing a case in which the light paths LP2 for examining the laser light are formed.

Figure 11:
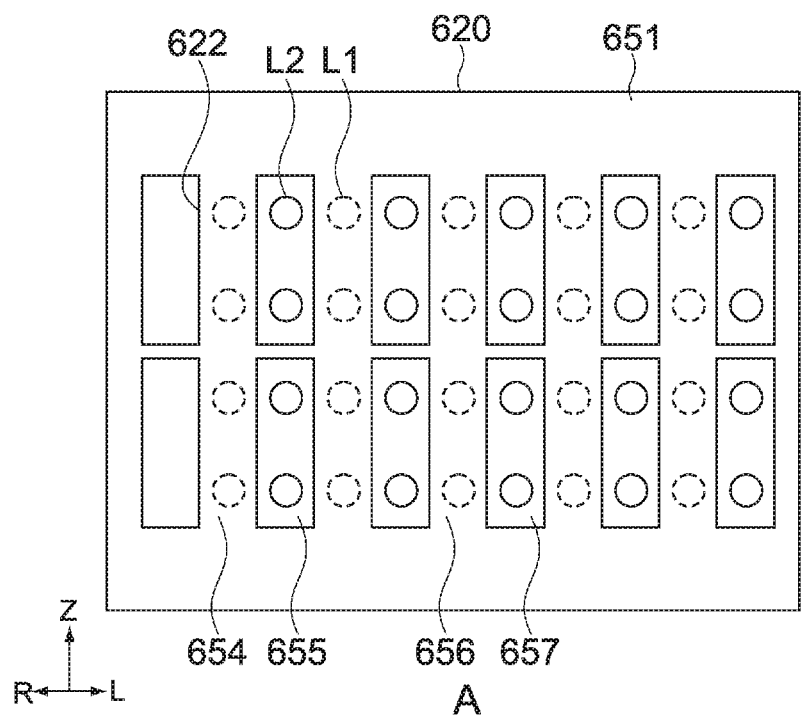
FIGS. 11A and 11B are views showing the configuration example of the reflection mirror.
Figure 11:
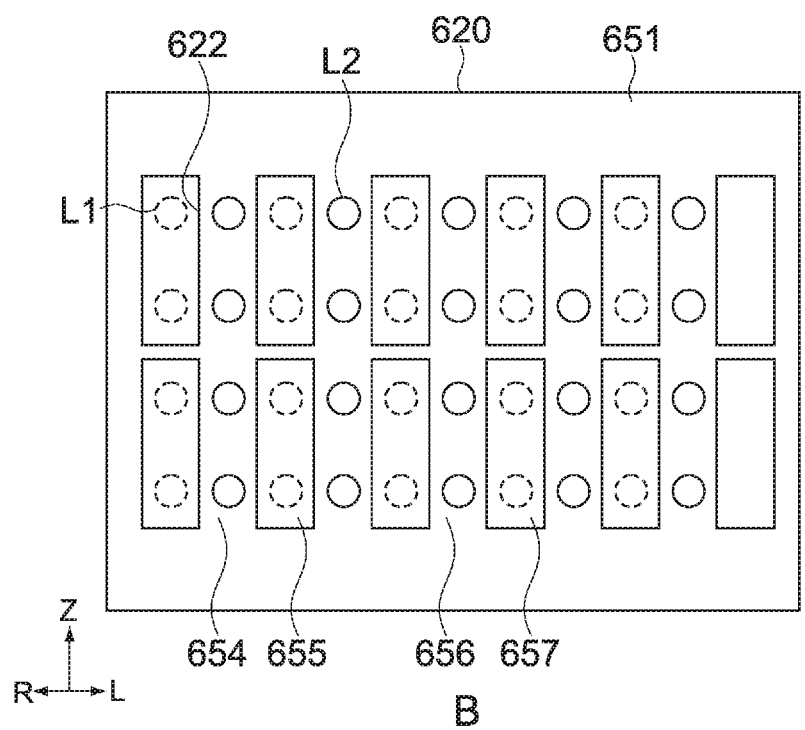

FIGS. 11A and 11B are schematic views showing a first incident surface 651 on which the laser light L1 emitted from the first light source section 650 is incident. FIG. 11A is a view showing a case in which the light paths LP1 for projecting an image are formed. FIG. 11B is a view showing a case in which the light paths LP2 for examining the laser light are formed.

In FIGS. 10A and 10B, the light fluxes of the laser light L1 incident on the first incident surface 621 from the first light source section 610 are schematically shown by circular shapes indicated by solid lines. Further, the light fluxes of the laser light L2 incident on the second incident surface 651 on an opposite side from the second light source section 650 are schematically shown by circular shapes indicated by wavy lines.

In FIGS. 11A and 11B, the light fluxes of the laser light L2 incident on the second incident surface 651 from the second light source section 650 are schematically shown by circular shapes indicated by solid lines. Further, the light fluxes of the laser light L1 incident on the first incident surface 621 on an opposite side from the first light source section 610 are schematically shown by circular shapes indicated by wavy lines.

The reflection mirror 620 is made of a light reflection member having light reflectivity at the first and second incident surfaces 621 and 650 and has a plurality of light transmission holes 622. A part of the reflection mirror 620 on which the light transmission holes 22 are not formed functions as a light reflection part. Further, the light transmission holes 622 formed on the reflection mirror 620 function as a light transmission part.

In both the first and second incident surfaces 621 and 651, entire regions in which the light transmission holes 622 are not formed are light reflection surfaces 624 and 654, and entire regions in which the light transmission holes 622 are formed are light transmission surfaces 625 and 655. That is, in the present embodiment, both surfaces of the light reflection part function as light reflection surfaces, and both surfaces of the light transmission part function as light transmission surfaces.

As shown in FIGS. 10A and 10B, the regions between the light transmission holes 622 in the light reflection surface 624 on the side of the first incident surface 621 are light reflection regions 626. Further, regions in the light transmission surface 625 in which the light transmission holes 622 are formed are light transmission regions 627. As shown in FIGS. 11A and 11B, the regions between the light transmission holes 622 in the light reflection surface 654 on the side of the second incident surface 651 are light reflection regions 656. Further, regions in the light transmission surface 655 in which the light transmission holes 622 are formed are light transmission regions 657.

As shown in FIGS. 9A, 10A, and 11A, the second light source section 650 is arranged at a position at which the laser light L2 passes through the light transmission regions 657 when the light reflection regions 626 are arranged on the light paths of the laser light L1. Further, as shown in FIGS. 9B, 10B, and 11B, the second light source section 650 is arranged at a position at which the laser light L2 is reflected by the light reflection regions 656 when the light transmission regions 627 are arranged on the light paths of the laser light L1.

Accordingly, the reflection mirror 620 is configured so that the light transmission regions 657 are arranged on the light paths of the laser light L2 in a state in which the light reflection regions 626 are arranged on the light paths of the laser light L1. Then, by the light reflection regions 626, the laser light L1 is reflected in the Y direction that is the emission direction of the laser light L2. As a result, the laser light L1 and the laser light L2 are made uniform in the same direction, and laser light having high brightness is emitted to a photosynthesis unit 120. Note that the state in which the light reflection regions 626 are arranged on the light paths of the laser light L1 corresponds to a first state in the present embodiment.

Further, the reflection mirror 620 is configured so that the light reflection regions 656 are arranged on the light paths of the laser light L2 in a state in which the light transmission regions 627 are arranged on the light paths of the laser light L1. Then, by the light reflection regions 656, the laser light L2 is reflected in the X direction that is the emission direction of the laser light L1. Thus, the laser light L1 and the laser light L2 are made uniform in the same direction and emitted to the sensor section 640. As a result, it becomes possible to simultaneously detect each of the states of the laser light L1 and the laser light L2. Note that a state in which the light transmission regions 627 are arranged on the light paths of the laser light L1 corresponds to a second state.

The sensor section 640 detects each of the states of the incident laser light L1 and the laser light L2. The configurations of the sensor section 640 are not limited, and arbitrary configurations may be employed.

The movement mechanism moves the reflection mirror 620 by the width of the light transmission holes 622 along an LR direction. Thus, it becomes possible to easily switch between the light paths LP1 for projecting an image shown in FIGS. 9A, 10A, and 11A and the light paths LP2 for examining the laser light shown in FIGS. 9B, 10B, and 11B.

Further, the reflection mirror 620 may be moved so that both a part of the light reflection part and a part of the light transmission part are arranged on the light paths of the laser light L1 (the light paths of the laser light L2). Thus, it is possible to emit the laser light LR and LT in each of the Y direction and the X direction in a divided manner.

Third Embodiment

Figure 12:
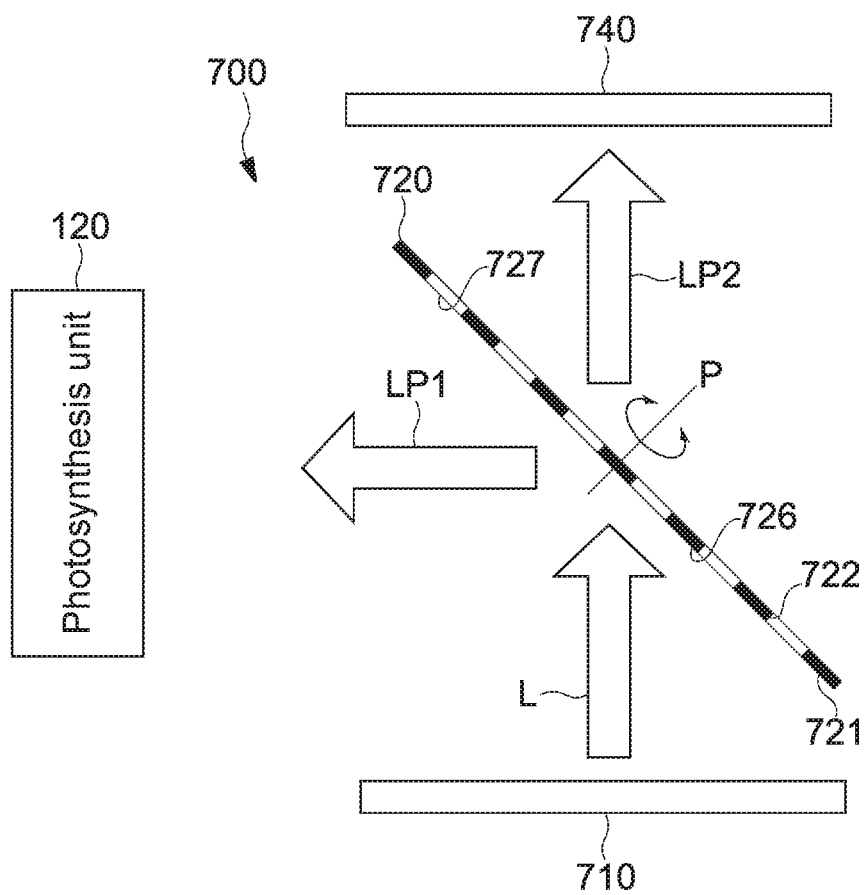
FIG. 12 is a schematic view showing a configuration example of a light source unit according to a third embodiment.

FIG. 12 is a schematic view showing a configuration example of a light source unit 700 according to a third embodiment. In the present embodiment, a reflection mirror 720 that functions as an optical element is rotatably held by a rotation driving mechanism (not shown) that functions as a holding section.

Further, when the reflection mirror 720 is rotated with a rotational axis P being used as a reference, a first state in which light reflection regions 726 of the reflection mirror 720 are arranged on the light paths of laser light L emitted from a light source section 710 and a second state in which light transmission regions 727 (light transmission holes 722) of the reflection mirror 720 are arranged on the light paths of the laser light L are switched to each other.

In the first state, light paths LP1 for projecting an image are formed, and the laser light L is emitted to a photosynthesis unit 120. In the second state, light paths LP2 for examining the laser light are formed, and the laser light is emitted to the sensor section 740.

In the present embodiment, the rotational axis P that extends in a direction substantially perpendicular to an incident surface 721 is provided at the center of the incident surface 721 on which the laser light L is incident. Of course, a position at which the rotational axis P is provided or the like is not limited.

Figure 13:
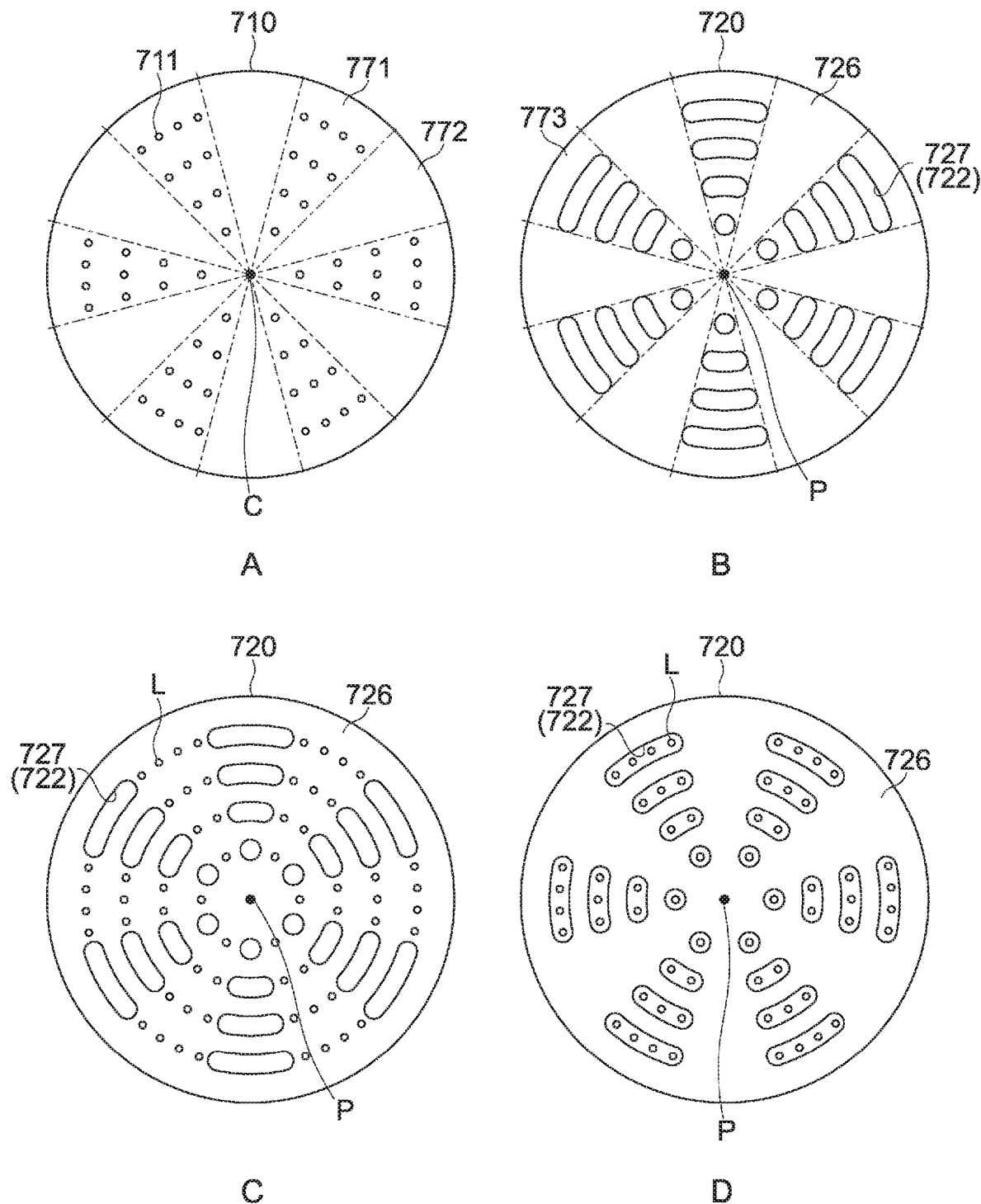
FIGS. 13A to 13D are schematic views showing a configuration example of a light source section and a reflection mirror.

FIGS. 13A to 13D are schematic views showing a configuration example of the light source section and the reflection mirror. As shown in FIG. 13A, 12 regions are provided at an interval of 30° with, for example, a center C of a circular mounting substrate being used as a reference. In each of six provision regions 771 among the 12 regions, the same number of laser light sources 711 are arranged. Note that the six provision regions 771 are provided with a non-provision region 772 sandwiched therebetween.

As shown in FIG. 13B, the reflection mirror 720 is provided with light reflection regions 726 and light transmission regions 727 (light transmission holes 722) corresponding to the arrangement of the laser light sources 711 of the light source section 710. In the present embodiment, 12 regions are provided at an interval of 30° with the center (rotational axis P) of the reflection mirror 720 being used as a reference. Among the 12 regions, six regions are light reflection regions 726, and the other six regions are light transmission hole forming regions 773. The light reflection regions 726 and the light transmission hole forming regions 773 are alternately arranged one by one. In the light transmission hole forming regions 773, light transmission holes 722 are formed corresponding to the positions of the laser light sources 711 of the light source section 710. In the present embodiment, three light transmission holes 722 are radially formed with respect to each one of the light transmission hole forming regions 733.

FIG. 13C is a schematic view showing a case in which the light paths PL1 for projecting an image are formed, and schematically shows the light fluxes of the laser light L incident on the light reflection regions 726. FIG. 13D is a schematic view showing a case in which the light paths LP2 for examining the laser light, and schematically shows the light fluxes of the laser light L passing through the light transmission regions 727 (light transmission holes 722). By rotating the reflection mirror 720 with the rotational axis P being used as a reference, it is possible to easily switch between the first state shown in FIG. 13C and the second state shown in FIG. 13D.

Further, in the present embodiment, it becomes possible to emit the laser light L having a certain frequency along each of a Y direction and an X direction by rotating the reflection mirror 720 at a prescribed frequency. That is, it becomes possible to obtain the two laser light L having the certain frequency. By controlling the rotation frequency of the reflection mirror 720, it is possible to control the frequency of the laser light L, that is, a frequency for switching between an ON state and an OFF state to emit the laser light.

In an example shown in FIGS. 13A to 13D, the first state and the second state are switched to each other every time the reflection mirror 720 is rotated by 30°. Accordingly, the first state and the second state are switched to each other six times during one rotation of the reflection mirror 720. For example, when the reflection mirror 720 is rotated at a rotation frequency of 1000 Hz, it becomes possible to emit the laser light L having a frequency of 6000 Hz. Note that it becomes possible to arbitrarily set the relationship between the rotation frequency and the frequency of the laser light L by appropriately designing the configurations of the light source section 710 and the reflection mirror 720.

Generally, when laser light sources are frequency-driven, a power supply corresponding to the frequency driving is required. Further, an overshoot caused at a moment at which the power supply is turned on has an adverse affect on the service life of the laser light sources. Therefore, the frequency driving of the laser light sources often requires a certain amount of cost and causes technological concerns. Further, it is often difficult to freely change a frequency due to restrictions on the power supply.

By the employment of a configuration in which the reflection mirror 720 having the light reflection regions 726 and the light transmission regions 727 is rotated like the light source unit 700 according to the present embodiment, it is easy to change the number of rotations of a motor. Therefore, it is possible to easily and freely change the frequency of the laser light L.

For example, in a case in which a liquid crystal panel is used as an image generation element or the like, an afterimage (moving image blurring) is likely to occur due to a response time. For example, by turning off the irradiation of a backlight at a time at which a liquid crystal element is rotated during the switching of a frame, it becomes possible to reduce the after-image. By the application of the present technology, it becomes possible to easily control the frequency of the laser light L according to a frame rate and realize a reduction in after-image. Besides, the laser light L having a desired frequency may be generated according to arbitrary control.

Figure 14:
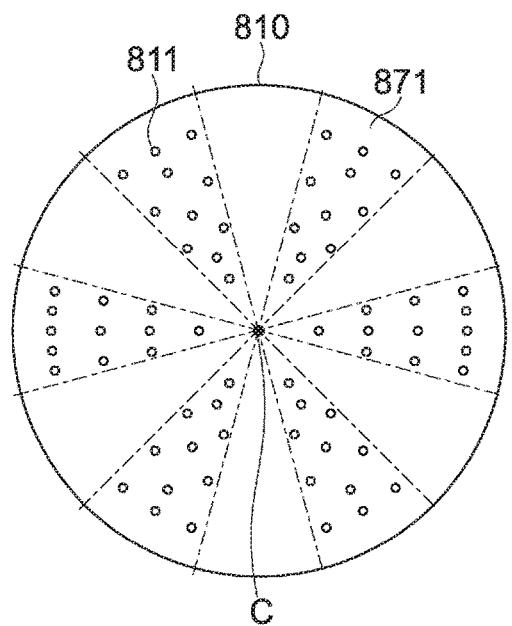
FIGS. 14A to 14D are schematic views showing another configuration example of the light source section and the reflection mirror.
Figure 14:
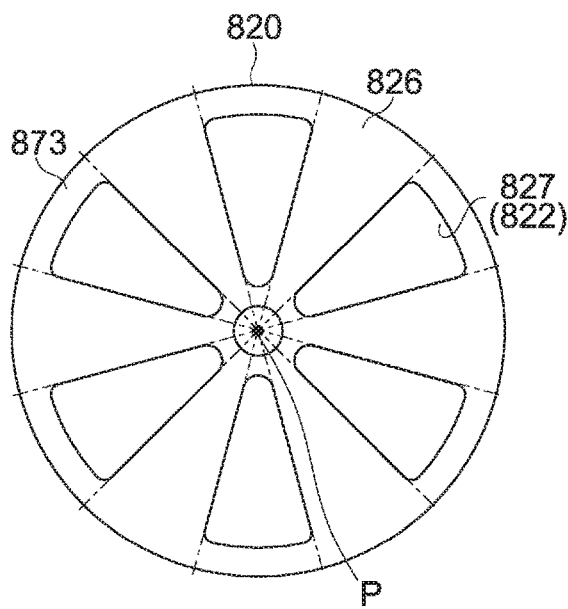
Figure 14:
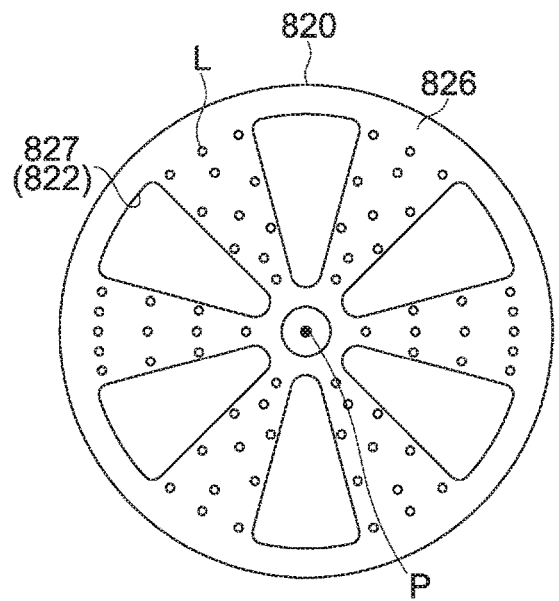
Figure 14:
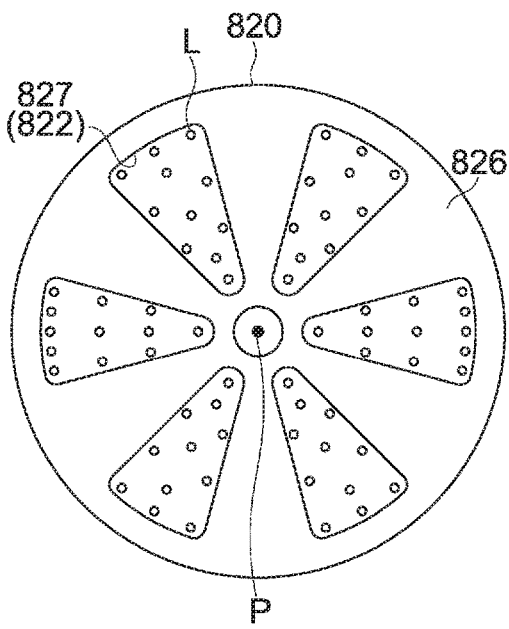

FIGS. 14A to 14D are schematic views showing another configuration example of the light source section and the reflection mirror. As shown in FIG. 14A, a plurality of laser light sources 811 is arranged in each of six provision regions 871 provided at an interval of 30° in a light source section 810 as well. Note that two types of arrangement patterns are employed as the arrangement patterns of the plurality of laser light sources 811 arranged in the provision regions 871. Like this, the arrangement patterns of the laser light sources 811 may be arbitrarily set, or all the arrangement patterns with respect to each of the provision regions 871 may be different from each other.

As shown in FIG. 14B, a reflection mirror 820 is provided with six light reflection regions 826 and six light transmission hole forming regions 873. In an example shown in FIG. 14B, one light transmission hole 822 is formed over almost the entirety of each of the light transmission hole forming regions 873. The shape or the like of the light transmission holes 822 is not limited like this and may be arbitrarily designed. Note that the light transmission holes 822 serve as light transmission regions 827.

FIG. 14C is a schematic view showing a case in which the light paths LP1 for projecting an image are formed, and schematically shows the light fluxes of the laser light L incident on light reflection regions 826. FIG. 14D is a schematic view showing a case in which the light paths LP2 for examining the laser light are formed, and schematically shows the light fluxes of the laser light L passing through light transmission regions 827. By rotating the reflection mirror 820, it is possible to easily switch between the first state shown in FIG. 14C and the second state shown in FIG. 14D.

Further, by controlling the rotation frequency of the reflection mirror 820, it is possible to control the frequency of the laser light L. By the configurations shown in FIGS. 14A to 14D, it becomes possible to switch between an ON state and an OFF state to emit the laser light L along the X direction and the Y direction at a frequency six times as large as the rotation frequency like the configurations shown in FIGS. 13A to 13D.

Figure 15:
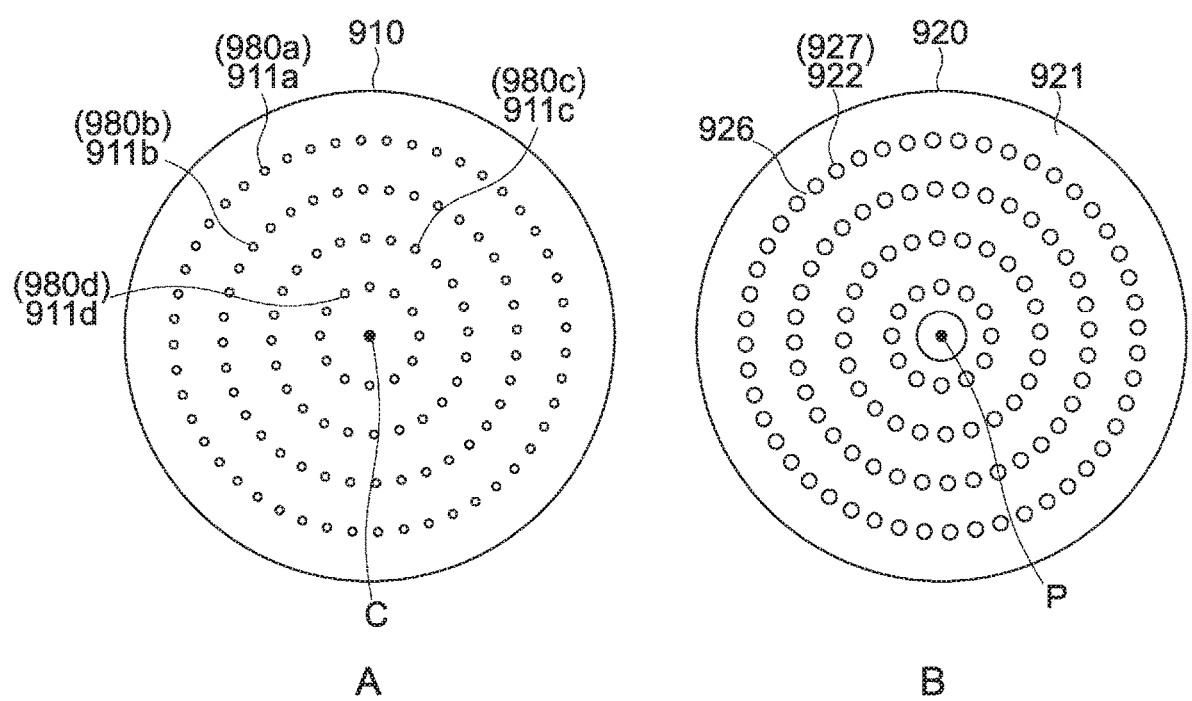
FIGS. 15A and 15B are schematic views showing another configuration example of the light source section and the reflection mirror.

FIGS. 15A and 15B and FIGS. 16A to 16E are schematic views showing another configuration example of the light source section and the reflection mirror. As shown in FIG. 15A, a plurality of laser light sources 911 is concentrically arranged with a center C of a circular mounting substrate being used as a reference in a light source section 910. That is, the laser light sources 911 are each arranged on the circumferences of a plurality of concentric circles having the same center C. Specific configurations are as follows.

On an outermost circumference, 48 laser light sources 911a are arranged at even intervals.

On a circumference on an inner side, 36 laser light sources 911b are arranged at even intervals.

On a circumference on a further inner side, 24 laser light sources 911c are arranged at even intervals.

On an innermost circumference, 12 laser light sources 911d are arranged at even intervals.

In this manner, the 120 laser light sources 911 are arranged.

The 48 laser light sources 911a are set as first light source sections 980a, and the 36 laser light sources 911b are set as second light source sections 980b. Further, the 24 laser light sources 911c are set as third light source sections 980c, and the 12 laser light sources 911d are set as fourth light source sections 980d.

As shown in FIG. 15B, light transmission holes 922 are formed one by one with respect to the laser light sources 911 on an incident surface 921 of a reflection mirror 920. Specific configurations are as follows.

On an outermost circumference, 48 light transmission holes 922 are formed at even intervals.

On a circumference on an inner side, 36 light transmission holes 922 are arranged at even intervals.

On a circumference on a further inner side, 24 light transmission holes 922 are arranged at even intervals.

On an innermost circumference, 12 light transmission holes 922 are arranged at even intervals.

In this manner, the 120 light transmission holes 922 are arranged.

The respective light transmission holes 922 serve as light transmission regions 927, and the regions between the light transmission holes 922 arranged side by side along the concentric circumferences serve as light reflection regions 926. Accordingly, in the configuration shown in FIG. 15B, the plurality of light reflection regions 926 and the plurality of light transmission regions 927 are arranged to be alternately provided side by side along a rotational direction at prescribed distances from a rotational axis P.

Further, at positions different in position from the rotational axis P, the light reflection regions 926 (the plurality of light transmission regions 927) formed along the rotational direction are different in number from each other. For example, it is assumed that a position on the outermost circumference is the position of a first distance from the rotational axis P. At the position of the first distance, the 48 light reflection regions 926 (first light reflection regions) are formed along the rotational direction. It is assumed that a position on the innermost circumference is the position of a second distance from the rotational axis P. At the position of the second distance, the 12 light reflection regions 926 (second light reflection regions) are formed along the rotational direction. Like this, the reflection mirror 920 is configured so that the number of the first light reflection regions and the number of the second light reflection regions are different from each other. Note that the settings of the first and second distances to positions on the circumferences are not limited.

FIGS. 16A to 16E are schematic views showing a case in which the reflection mirror 920 is sequentially rotated at the same angle. The rotation angle is an angle at which a state in which the outermost light reflection regions 926 of the reflection mirror 920 are arranged on the light paths of the outermost 48 laser light sources 911a (the first light source sections 980a) of the light source section 910 and a state in which the light transmission regions 927 are arranged on the light paths are switched to each other. Specifically, the reflection mirror 920 is rotated at an angle of 360°/(48×2) =3.75°.

As shown in FIGS. 16A to 16E, a first state in which the light transmission regions 927 are arranged on the light paths and a second state in which the light reflection regions 926 are arranged on the light paths are switched to each other four times as for the first light source sections 980a. The reflection mirror 920 returns to a state shown in FIG. 16A when further rotated four times. The first state and the second state are switched to each other 96 times during one rotation of the reflection mirror 920.

Figure 16:
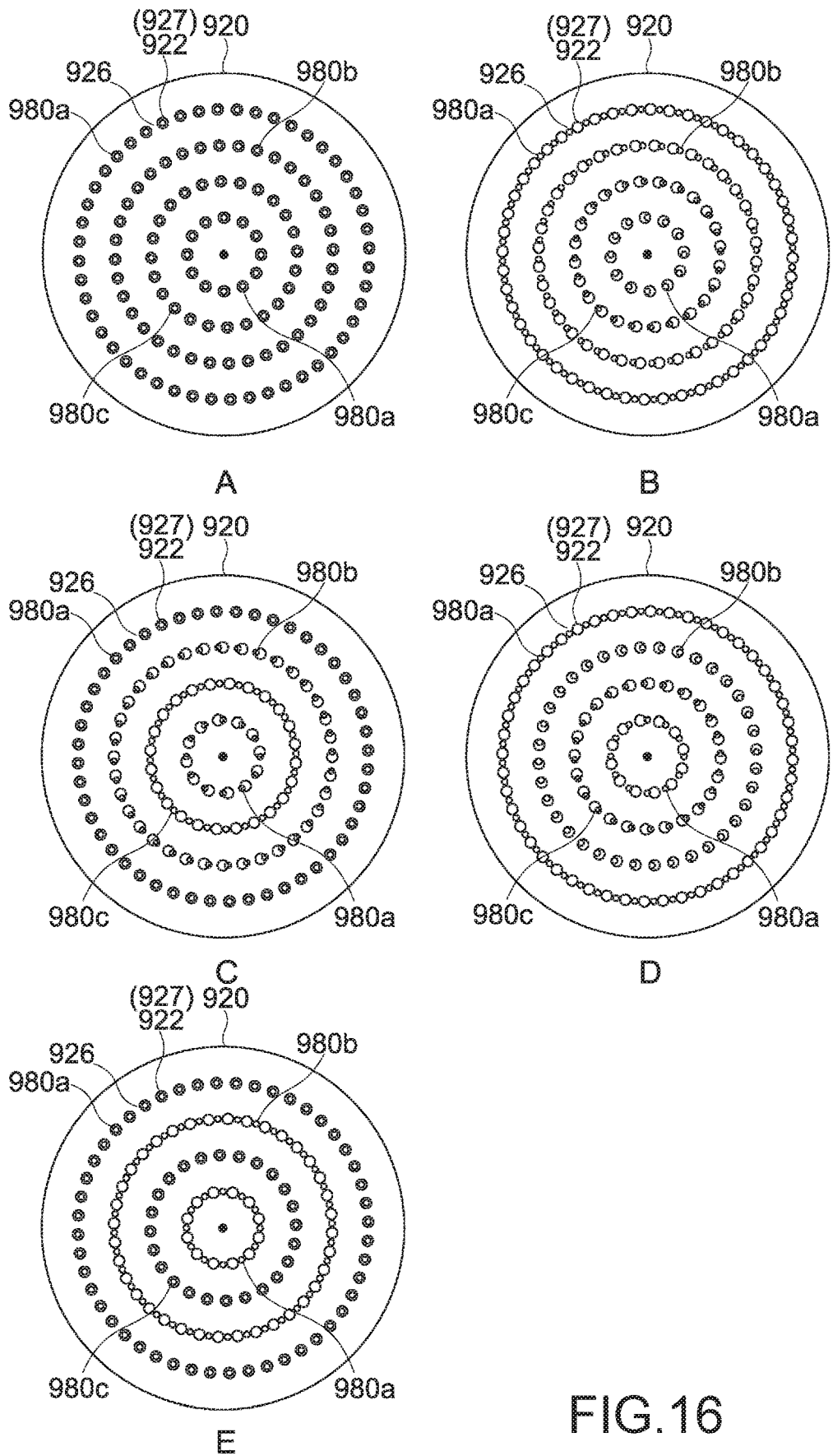
FIGS. 16A to 16E are schematic views showing another configuration example of the light source section and the reflection mirror.

As for the second light source sections 980b arranged on the inner side, the switching is performed three times from the second state shown in FIG. 16A to the first state shown in FIG. 16E. The reflection mirror 920 returns to the state shown in FIG. 16A when further rotated four times. The first state and the second state are switched to each other 72 times during one rotation of the reflection mirror 920.

As for the third light source sections 980c arranged on the further inner side, the switching is performed twice from the second state shown in FIG. 16A to the second state shown in FIG. 16E. The reflection mirror 920 returns to the state shown in FIG. 16A when further rotated four times. The first state and the second state are switched to each other 48 times during one rotation of the reflection mirror 920.

As for the first light source sections 980d arranged on the innermost side, the switching is performed once from the second state shown in FIG. 16A to the first state shown in FIG. 16E. The reflection mirror 920 returns to the state shown in FIG. 16A when further rotated four times. The first state and the second state are switched to each other 24 times during one rotation of the reflection mirror 920.

As described above, in the configurations shown in FIGS. 15A and 15B and FIGS. 16A to 16E, the number of times of the switching between the first state and the second state according to the rotation of the reflection mirror 920 becomes different between the first to fourth light source sections 980*a* to 980*d*. Accordingly, the frequency of the laser light L with respect to the rotation frequency of the reflection mirror 920 also becomes a different value between the first to fourth light source sections 980*a* to 980*d*.

When the rotation frequency is expressed as FHz, the frequency of the laser light L emitted from the first light source sections 980*a* becomes 96 FHz and the frequency of the laser light L emitted from the second light source sections 980*b* becomes 720 FHz. Further, the frequency of the laser light L emitted from the third light source sections 980*c* becomes 48 FHz, and the frequency of the laser light L emitted from the fourth light source sections 980*d* becomes 24 FHz.

As a result, it becomes possible to emit the laser light L having a plurality of frequencies, that is, the laser light L multiplexed in terms of frequency in each of the X direction and the Y direction. Thus, it becomes possible to reduce the flickering, the speckle noise, or the like of a projected image. For example, it is assumed that the effect of reducing the speckle noise can be substantially obtained when the laser light L is multiplexed at a frequency of an image signal or more.

It can be said that the configurations shown in FIGS. 15A and 15B and FIGS. 16A to 16E are configurations with which it is possible to switch the first state and the second state at different frequencies for each of the plurality of first to fourth light source sections 980*a* to 980*d*. By rotating the reflection mirror 920, it becomes possible to easily emit the light multiplexed in terms of frequency without upsizing the apparatus.

Figure 17:
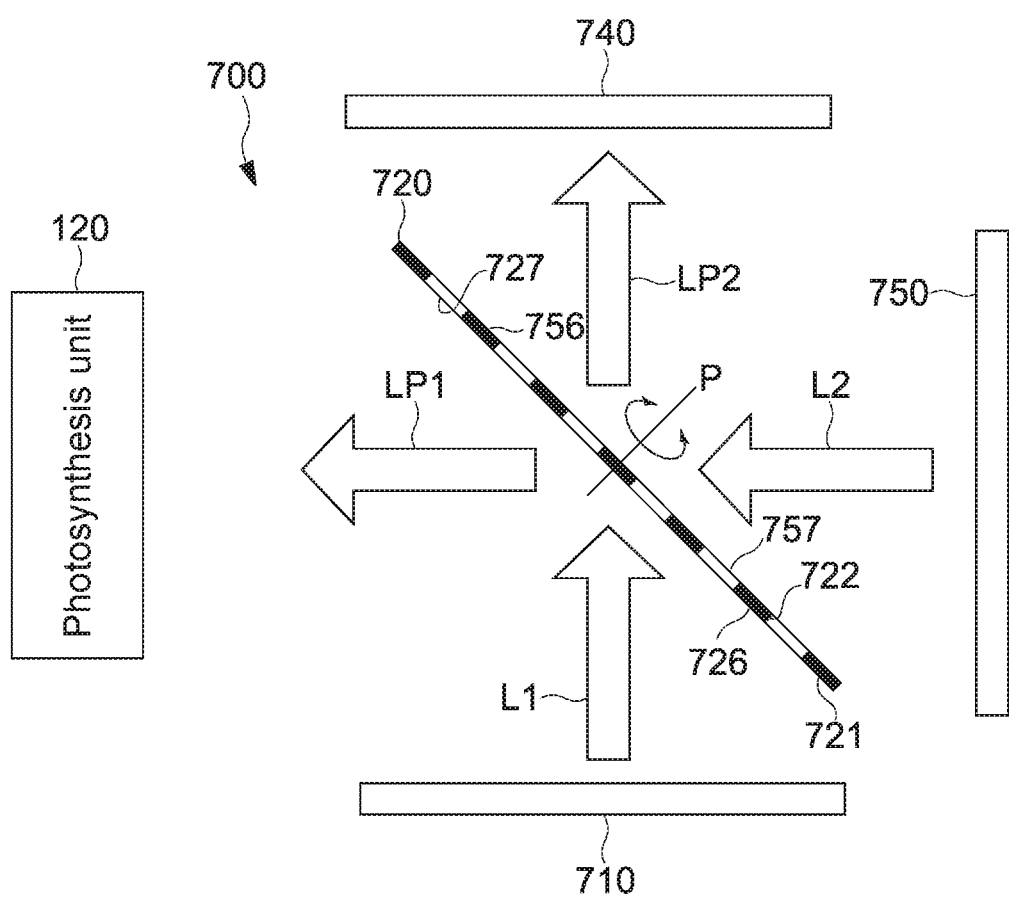
FIG. 17 is a schematic view showing a configuration example in a case in which another light source section is arranged in the third embodiment.

As shown in FIG. 17, another light source section 750 may be arranged so that its emission direction is substantially orthogonal to the light source section 710. When laser light L1 emitted from the light source section 710 is reflected by the light reflection regions 726, laser light L2 (another emitted light) emitted from another light source section 750 passes through light transmission regions 757. When the laser light L1 emitted from the light source section 710 passes through the light transmission regions 727, the laser light L2 (the other emitted light) emitted from the other light source section 750 is reflected by light reflection regions 756. Thus, it becomes possible to make the laser light L1 from the light source section 710 and the laser light L2 from the other light source section 750 uniform in the same direction.

For example, another light source section 750 having substantially the same configurations as those of the light source sections 710, 810, and 910 shown in FIGS. 13A, 14A, and 15A is prepared. Then, the other light source section 750 is rotated by a prescribed angle to be arranged with respect to the light source section 710 so that light reflection and light transmission with respect to the reflection mirror are reversed. In the examples shown in FIGS. 13A and 14A, the other light source section 750 is rotated by 30° with respect to the light source section 710 to be arranged. In the example shown in FIG. 15A, the other light source section 750 is rotated by 3.75° to be arranged.

Other Embodiments

The present technology is not limited to the embodiments described above and can realize various other embodiments.

In the above embodiments, the light transmission holes are formed on the light reflection member to constitute the optical element having the light reflection part and the light transmission part. Instead of this, reflection coating by silver, chrome, aluminum, or the like may be applied to a light transmission member such as glass to constitute an optical element having a light reflection part and a light transmission part. A part to which the reflection coating is applied functions as the light reflection part, and the other part functions as the light transmission part. Besides, arbitrary configurations may be employed as the configurations of the optical element.

In the above embodiments, the laser light not used for image generation by the image generation unit is incident on the sensor section. Instead of the sensor section, another image generation unit capable of generating an image may be provided. Further, light paths for projecting an image are constituted of two systems according to the present technology, and each of the image generation unit and the other image generation unit may generate an image. That is, the LP2 for examining the laser light L shown in FIG. 5 or the like may be used as light paths for projecting another image. Thus, it becomes possible to synthesize a plurality of images together by using one light source section. Further, it becomes possible to freely change the balance of the light amounts of a plurality of images by switching the position of an optical element.

In the configuration shown in FIG. 2 or the like as well in which the reflection mirror 20 is moved in parallel, it is possible to emit the laser light L having a frequency by switching between the first state and the second state at a prescribed frequency.

In the above embodiments, the emission direction of the laser light is switched in a direction different by approximately 90°. The direction in which the emission direction is switched is not limited, and the emission direction may be switched at another angle. For example, by controlling the arrangement angle of the optical element with respect to the emission direction of the light emitted from the light source section, it is possible to arbitrarily control the emission direction of the emitted light reflected by the optical element.

Using three or more light source sections, each of emission directions may be appropriately switched according to the movement or the rotation of an optical element. Further, a direction in which the optical element is moved is not limited. In the example shown in FIG. 1, it is possible to switch between the light paths LP1 for projecting an image and the light paths LP2 for examining the laser light L even when the reflection mirror 20 is moved in parallel along the Y direction.

Among the features according to the present technology described above, it is also possible to combine at least two features together. That is, the various features described in the respective embodiments may be arbitrarily combined together without the distinction of the respective embodiments. Further, the various effects described above are given only for illustration and are not limitative, and other effects may be produced.

Note that the present technology can also employ the following configurations.

(1) An image display apparatus including:
a light source section that emits light;
an optical element that includes a light reflection part and a light transmission part provided at a position different from a position of the light reflection part; and a holding section that movably or rotatably holds the optical element and is capable of switching between a first state in which the light reflection part is arranged on a light path of the emitted light and a second state in which the light transmission part is arranged on the light path of the emitted light.

(2) The image display apparatus according to (1), in which the holding section causes the optical element to move in parallel in a prescribed direction.

(3) The image display apparatus according to (1) or (2), in which
the light reflection part has a light reflection surface, and
the light transmission part has a light transmission surface adjacent to at least a part of the light reflection surface.

(4) The image display apparatus according to (3), in which
the light source section has a plurality of light sources,
the light reflection surface has a plurality of light reflection regions provided corresponding to the plurality of light sources, and
the light transmission surface has a plurality of light transmission regions provided corresponding to the plurality of light sources, each of the plurality of light transmission regions being adjacent to at least one of the plurality of light reflection regions.

(5) The image display apparatus according to any one of (1) to (4), further including:
an image generation unit that generates an image on the basis of first emitted light representing the emitted light reflected by the light reflection part and second emitted light representing the emitted light that passes through the light transmission part.

(6) The image display apparatus according to (5), further including:
a sensor section that detects a state of emitted light not used for image generation by the image generation unit among the first emitted light and the second emitted light.

(7) The image display apparatus according to (6), further including:
a notification unit that notifies state information regarding a state of the light source section on the basis of a detection result by the sensor section.

(8) The image display apparatus according to (5), further including:
another image generation unit that generates an image on the basis of emitted light not used for image generation by the image generation unit among the first emitted light and the second emitted light.

(9) The image display apparatus according to any one of (1) to (8), further including:
another light source section that emits another light, in which
the optical element has the light transmission part arranged on a light path of the other emitted light in the first state, and has the light reflection part arranged on the light path of the other emitted light in the second state.

(10) The image display apparatus according to (9), in which
the light source section emits the emitted light along a first direction,
the other light source section emits the other emitted light along a second direction, and
the optical element reflects the emitted light in the second direction by the light reflection part in the first state and reflects the other emitted light in the first direction by the light reflection part in the second state.

(11) The image display apparatus according to (9) or (10), in which
the first direction and the second direction are substantially orthogonal to each other.

(12) The image display apparatus according to any one of (1) to (11), in which
the holding section causes the optical element to move so that a part of the light reflection part and a part of the light transmission part are arranged on the light path of the emitted light.

(13) The image display apparatus according to (12), in which
the holding section controls a ratio of a size of the part of the light reflection part arranged on the light path of the emitted light to a size of the part of the light transmission part arranged on the light path of the emitted light.

(14) The image display apparatus according to any one of (1) and (3) to (11), in which
the optical element has an incident surface on which the emitted light is incident, and
the holding section causes the optical element to rotate with a rotational axis substantially perpendicular to the incident surface being used as a reference.

(15) The image display apparatus according to (14), in which
the holding section causes the optical element to rotate at a prescribed frequency.

(16) The image display apparatus according to (14) or (15), in which
the holding section causes the optical element to rotate with the rotational axis passing through a center of the incident surface being used as a reference,
the optical element has a plurality of first light reflection regions formed along a rotational direction at a position of a first distance from the center of the incident surface and a plurality of second light reflection regions formed along the rotational direction at a position of a second distance from the center of the incident surface, the second distance being different from the first distance, and
the number of the first light reflection regions and the number of the second light reflection regions are different from each other.

(17) The image display apparatus according to any one of (1) to (16), in which
the optical element is made of a light reflection member, and
the light transmission part is constituted of a light transmission hole formed on the light transmission member.

(18) The image display apparatus according to any one of (1) to (16), in which
the optical element is made of a light transmission member, and
the light reflection part is constituted of a part to which light reflection coating is applied.

(19) A light source device including:
a light source section that emits light;
an optical element that includes a light reflection part and a light transmission part provided at a position different from a position of the light reflection part; and
a holding section that movably or rotatably holds the optical element and is capable of switching between a first state in which the light reflection part is arranged on a light path of the emitted light and a second state in which the light transmission part is arranged on the light path of the emitted light.

REFERENCE SIGNS LIST

L, L1, L2 laser light
LP1 light path for projecting image

LP2 light path for examining laser light
P rotational axis
10, 710, 810, 910 light source section
11, 611, 651, 711, 811 laser light source
20, 620, 720, 820, 920 reflection mirror
21, 621, 651, 721, 921 incident surface
22, 622, 722, 822, 922 light transmission hole
24, 624, 654 light reflection surface
25, 625, 655 light transmission surface
26, 626, 656, 726, 756, 826, 926 light reflection region
27, 627, 657, 727, 757, 827, 927 light transmission region
40, 640, 740 sensor section
100 light source device
110, 600, 700 light source unit
110G green light source unit
110B blue laser light source
110R red light source unit
120 photosynthesis unit
200 image generation unit
400 projection system
500 image display apparatus
610 first light source section
650 second light source section
750 another light source section
911a to 911d laser light source
980a to 980d first to fourth light source sections

The invention claimed is:

1. An image display apparatus comprising:
   a light source section configured to emit light;
   an optical element that includes a light reflection part and a light transmission part provided at a position different from a position of the light reflection part;
   a movement mechanism configured to movably or rotatably hold the optical element and to switch between a first state in which the light reflection part is arranged on a light path of the emitted light and a second state in which the light transmission part is arranged on the light path of the emitted light;
   a photosynthesis unit configured to generate color light using one of first emitted light representing the emitted light reflected by the light reflection part or second emitted light representing the emitted light that passes through the light transmission part; and
   a sensor system configured to detect a state of emitted light not used for color light generation by the photosynthesis unit among the first emitted light and the second emitted light.

2. The image display apparatus according to claim 1, wherein
   the movement mechanism is configured to cause the optical element to move in parallel in a prescribed direction.

3. The image display apparatus according to claim 1, wherein
   the light reflection part has a light reflection surface, and
   the light transmission part has a light transmission surface adjacent to at least a part of the light reflection surface.

4. The image display apparatus according to claim 3, wherein
   the light source section has a plurality of light sources,
   the light reflection surface has a plurality of light reflection regions provided corresponding to the plurality of light sources, and
   the light transmission surface has a plurality of light transmission regions provided corresponding to the plurality of light sources, each of the plurality of light transmission regions being adjacent to at least one of the plurality of light reflection regions.

5. The image display apparatus according to claim 1, further comprising:
   an image generation unit configured to generate an image on a basis of the first emitted light representing the emitted light reflected by the light reflection part and the second emitted light representing the emitted light that passes through the light transmission part.

6. The image display apparatus according to claim 5, further comprising:
   another image generation unit configured to generate an image on a basis of emitted light not used for image generation by the image generation unit among the first emitted light and the second emitted light.

7. The image display apparatus according to claim 1, further comprising:
   a notification circuit configured to notify state information regarding a state of the light source section on a basis of a detection result by the sensor system.

8. The image display apparatus according to claim 1, further comprising:
   another light source section that emits other light, wherein
   the optical element has the light transmission part arranged on a light path of the other emitted light in the first state, and has the light reflection part arranged on the light path of the other emitted light in the second state.

9. The image display apparatus according to claim 8, wherein
   the light source section is configured to emit the emitted light along a first direction,
   the other light source section is configured to emit the other emitted light along a second direction, and
   the optical element is configured to reflect the emitted light in the second direction by the light reflection part in the first state and to reflect the other emitted light in the first direction by the light reflection part in the second state.

10. The image display apparatus according to claim 9, wherein
    the first direction and the second direction are substantially orthogonal to each other.

11. The image display apparatus according to claim 1, wherein
    the movement mechanism is configured to cause the optical element to move so that a part of the light reflection part and a part of the light transmission part are arranged on the light path of the emitted light.

12. The image display apparatus according to claim 11, wherein
    the movement mechanism is configured to control a ratio of a size of the part of the light reflection part arranged on the light path of the emitted light to a size of the part of the light transmission part arranged on the light path of the emitted light.

13. The image display apparatus according to claim 1, wherein
    the optical element has an incident surface on which the emitted light is incident, and
    the movement mechanism is configured to cause the optical element to rotate with a rotational axis substantially perpendicular to the incident surface being used as a reference.

14. The image display apparatus according to claim 13, wherein the movement mechanism is configured to rotate the optical element at a prescribed frequency.

15. The image display apparatus according to claim 13, wherein
the movement mechanism is configured to rotate the optical element with the rotational axis passing through a center of the incident surface being used as a reference,
the optical element has a plurality of first light reflection regions formed along a rotational direction at a position of a first distance from the center of the incident surface and a plurality of second light reflection regions formed along the rotational direction at a position of a second distance from the center of the incident surface, the second distance being different from the first distance, and
a number of the first light reflection regions and a number of the second light reflection regions are different from each other.

16. The image display apparatus according to claim 1, wherein
the optical element is made of a light reflection member, and
the light transmission part is constituted of a light transmission hole formed on the light reflection member.

17. The image display apparatus according to claim 1, wherein
the optical element is made of a light transmission member, and
the light reflection part is constituted of a part to which light reflection coating is applied.

18. A light source device comprising:
a light source section configured to emit light;
an optical element that includes a light reflection part and a light transmission part provided at a position different from a position of the light reflection part;
a movement mechanism configured to movably or rotatably hold the optical element and to switch between a first state in which the light reflection part is arranged on a light path of the emitted light and a second state in which the light transmission part is arranged on the light path of the emitted light;
a photosynthesis unit configured to generate color light using one of first emitted light representing the emitted light reflected by the light reflection part or second emitted light representing the emitted light that passes through the light transmission part; and
a sensor system configured to detect a state of emitted light not used for color light generation by the photosynthesis unit among the first emitted light and the second emitted light.

* * * * *